(12) United States Patent
Chen et al.

(10) Patent No.: US 9,415,393 B2
(45) Date of Patent: Aug. 16, 2016

(54) SYSTEMS AND METHODS FOR PROVIDING MICROFLUIDIC DEVICES

(71) Applicant: Board of Governors for Higher Education, State of Rhode Island and Providence Plantations, Providence, RI (US)

(72) Inventors: Hong Chen, South Kingstown, RI (US); Constantine Anagnostopoulos, North Kingstown, RI (US); Mohammed Faghri, East Greenwich, RI (US); Jeremy Cogswell, Johnston, RI (US)

(73) Assignee: Rhode Island Board of Education, State of Rhode Island and Providence Plantations, Providence, RI (US)

( * ) Notice: Subject to any disclaimer, the term of this patent is extended or adjusted under 35 U.S.C. 154(b) by 38 days.

(21) Appl. No.: 14/582,560

(22) Filed: Dec. 24, 2014

(65) Prior Publication Data

US 2015/0118741 A1   Apr. 30, 2015

Related U.S. Application Data

(62) Division of application No. 13/625,510, filed on Sep. 24, 2012, now Pat. No. 8,945,485.

(60) Provisional application No. 61/538,255, filed on Sep. 23, 2011.

(51) Int. Cl.
   *B01L 3/00* (2006.01)
   *F16K 99/00* (2006.01)

(52) U.S. Cl.
   CPC ..... *B01L 3/502738* (2013.01); *B01L 3/502707* (2013.01); *F16K 99/0017* (2013.01); *F16K 99/0021* (2013.01); *B01L 2200/0621* (2013.01); *B01L 2300/089* (2013.01); *B01L 2300/0816* (2013.01); *B01L 2300/126* (2013.01); *B01L 2300/165* (2013.01); *B01L 2400/0406* (2013.01); *B01L 2400/0688* (2013.01); *F16K 2099/0084* (2013.01)

(58) Field of Classification Search
   None
   See application file for complete search history.

(56) References Cited

U.S. PATENT DOCUMENTS

| | | |
|---|---|---|
| 2002/0086436 A1 | 7/2002 | Buechler |
| 2004/0013545 A1 | 1/2004 | Brown et al. |
| 2006/0159592 A1 | 7/2006 | Andersson et al. |
| 2008/0025873 A1 | 1/2008 | Harding |

(Continued)

FOREIGN PATENT DOCUMENTS

| | | |
|---|---|---|
| WO | 2010016916 A2 | 2/2010 |
| WO | 2010017578 A1 | 2/2010 |
| WO | 2010022324 A2 | 2/2010 |
| WO | 2010070461 A1 | 6/2010 |

OTHER PUBLICATIONS

International Preliminary Report on Patentability issued on Apr. 3, 2014 in connection with related International application No. PCT/US2012/056897, 8 pages.

(Continued)

*Primary Examiner* — Jill Warden
*Assistant Examiner* — Julie Tavares
(74) *Attorney, Agent, or Firm* — Gesmer Updegrove LLP

(57) ABSTRACT

A microfluidic valve system is disclosed that includes a matrix, a hydrophilic acceptor region a hydrophilic transfer region, and a hydrophobic gap between the acceptor region and the transfer region.

24 Claims, 19 Drawing Sheets

(56) References Cited

U.S. PATENT DOCUMENTS

2009/0298191 A1  12/2009  Whitesides et al.
2011/0053289 A1   3/2011  Lowe et al.
2011/0123398 A1   5/2011  Carrilho et al.

OTHER PUBLICATIONS

European Patent Office Communication Pursuant to Rules 161(2) and 162 EPC issued on Apr. 30, 2014 in connection with European Application No. 12834511.3, 3 pages.

International Search Report and Written Opinion of the International Searching Authority mailed Mar. 11, 2013 in connection with International Patent Application No. PCT/US12/056897, 10 pages.

First Examiner's Report issued by the Australian Patent Office on Feb. 24, 2015 in connection with related Australian patent application No. 2012312016, 2 pages.

European Patent Office Communication Pursuant to Rules 70(2) and 70a(2) EPC issued on Apr. 16, 2015 in connection with European Application No. 12834511.3, 1 page.

Extended European Search Report issued on Mar. 30, 2015 in connection with European Application No. 12834511.3, 6 pages.

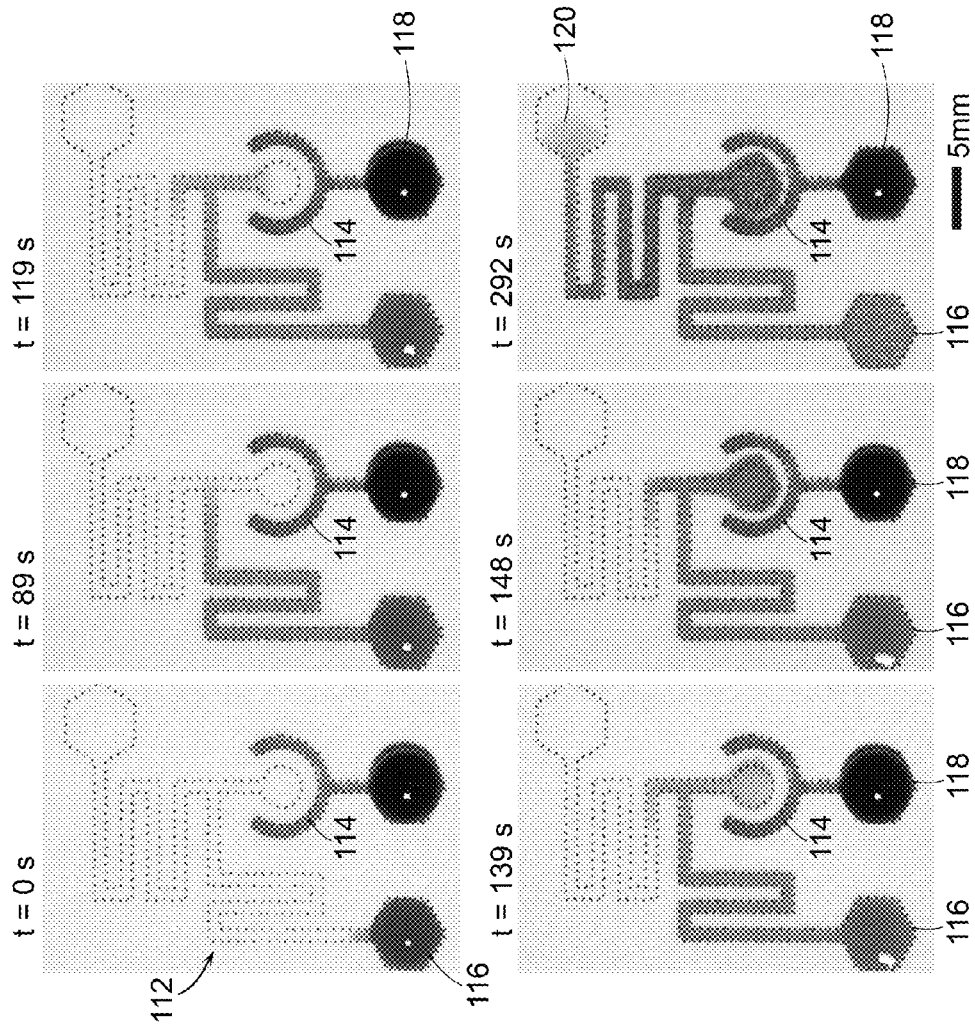
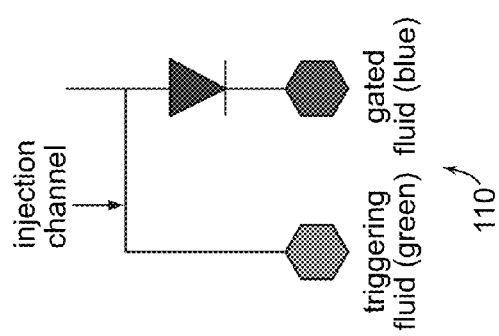
FIG. 7A
FIG. 7B

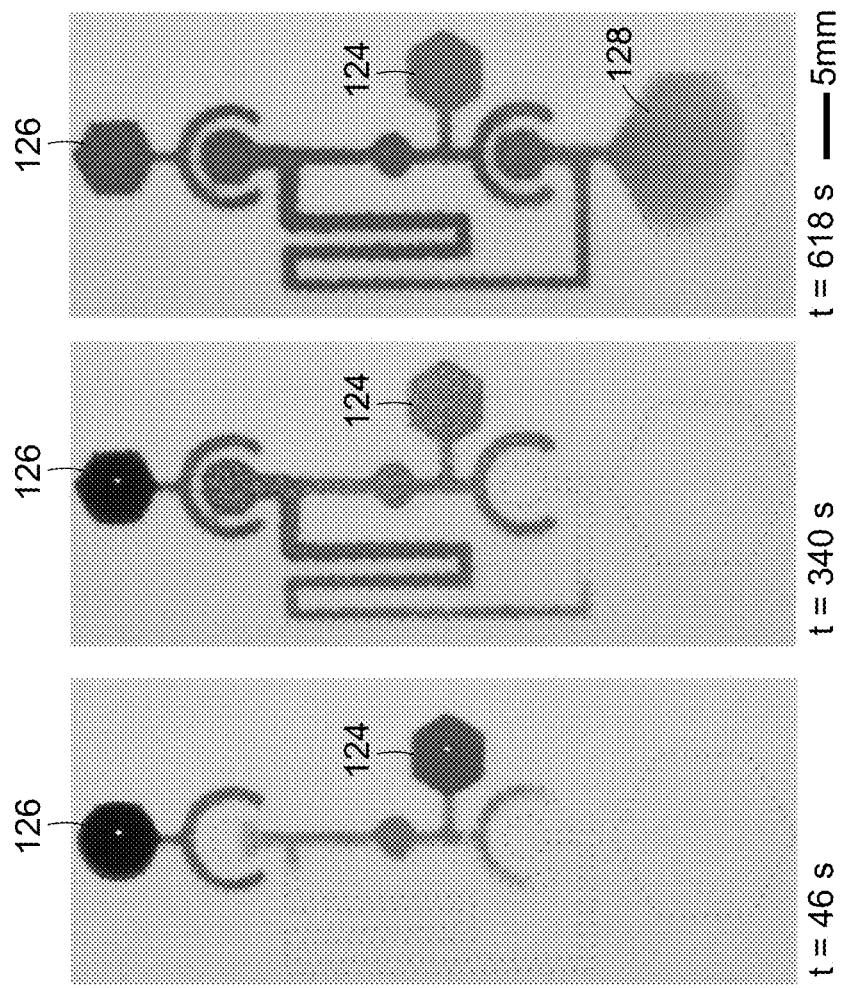
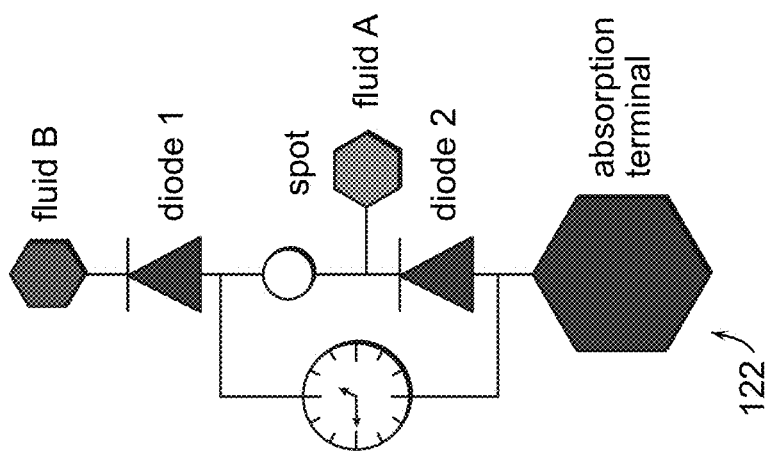
FIG. 8A
FIG. 8B

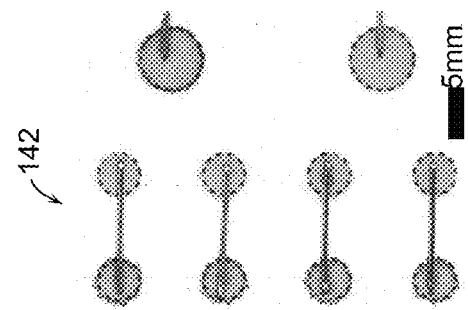
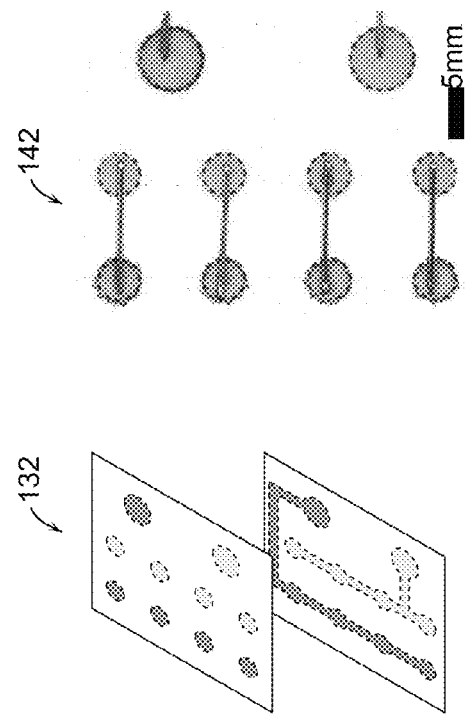
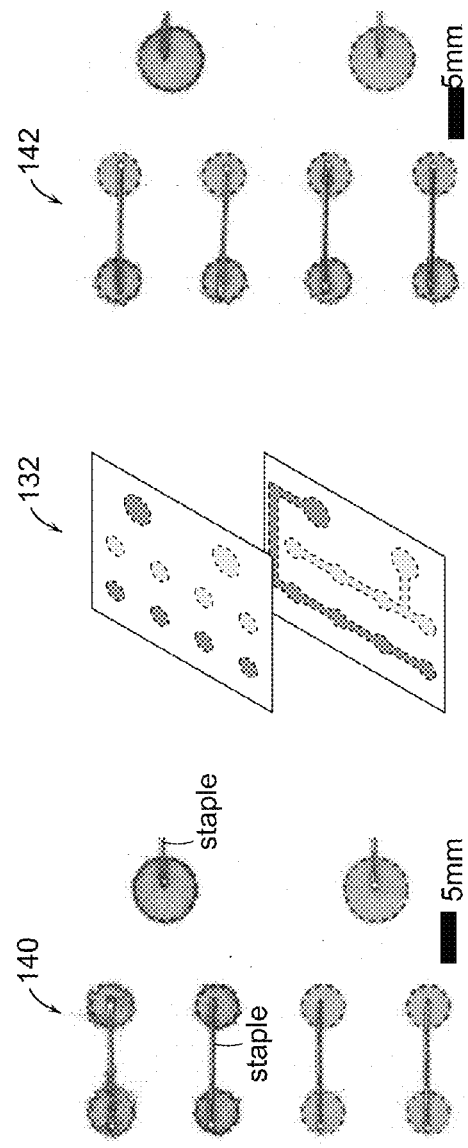
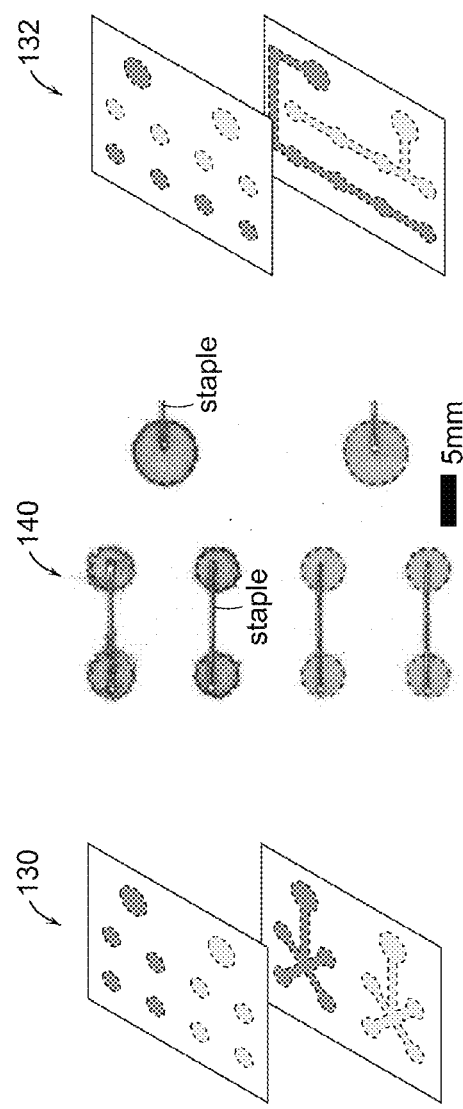
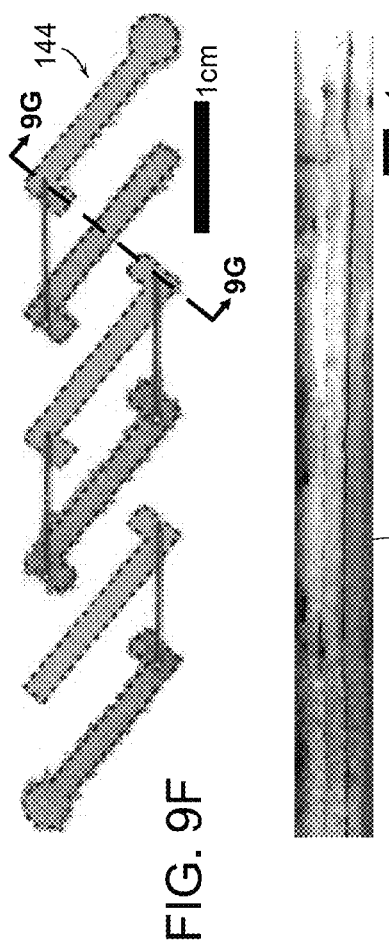
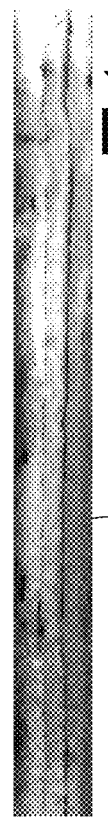
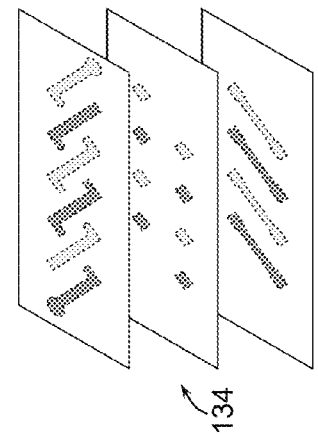

FIG. 13A
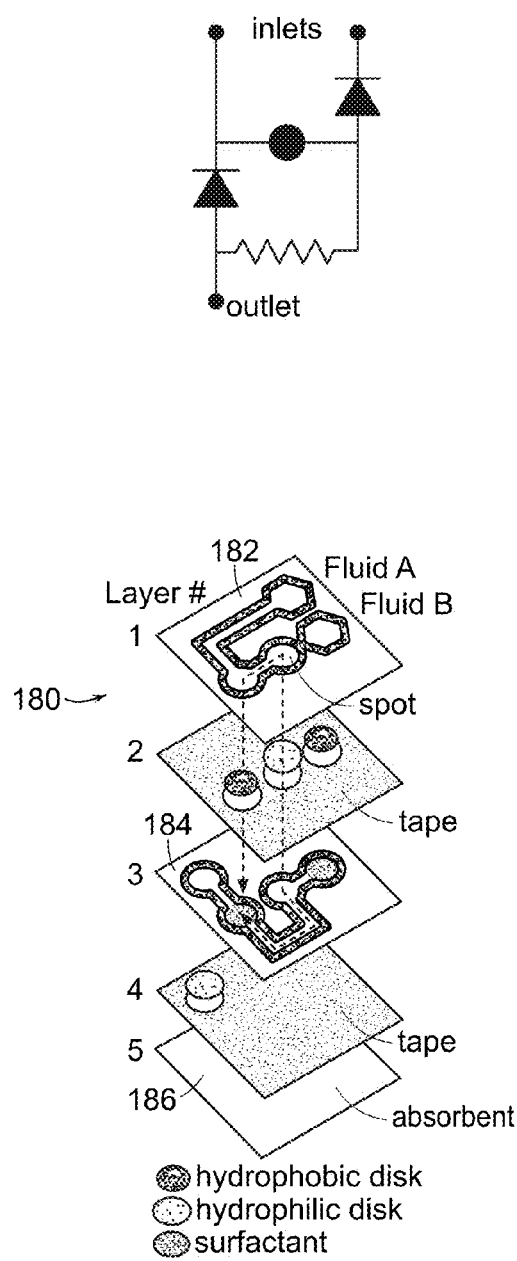
FIG. 13B
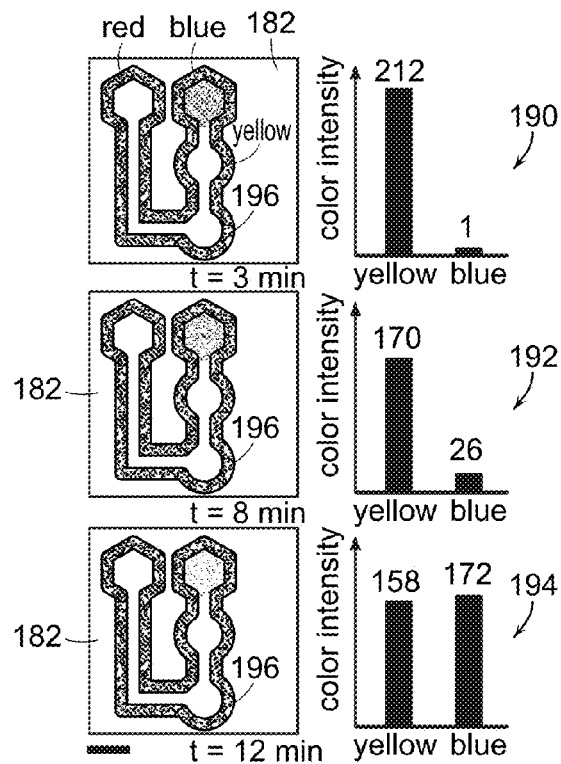
FIG. 13C
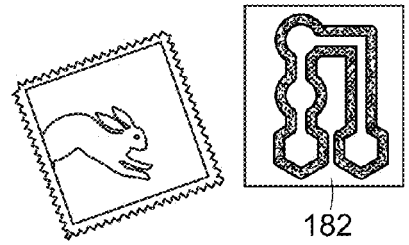
FIG. 13D

SYSTEMS AND METHODS FOR PROVIDING MICROFLUIDIC DEVICES

PRIORITY

This application is a divisional application of U.S. application Ser. No. 13/625,510 filed on Sep. 24, 2012, which claims priority to U.S. Provisional Patent Application Ser. No. 61/538,255 filed Sep. 23, 2011, the entire disclosures of which are hereby incorporated by reference in their entireties.

GOVERNMENT SUPPORT

This work is supported by the National Science Foundation under Grant No. NSF-OISE-0530203, the U.S. government has certain rights to this invention.

BACKGROUND

Self-contained paper microfluidic devices can provide inexpensive new tools for rapid diagnostic information in diverse applications such as the healthcare of an individual from a biological fluid or a hazardous chemical in an environment liquid sample. Advantageous elements of paper based microfluidic devices relative to traditional laboratory based diagnostics include the ease of use for individual, rapid diagnostics, lack of sophisticated support equipment, simplified assessment of diagnostic result, low cost, and disposability to prevent contamination.

Since the 1990s, many advances have been made regarding the development of two-dimensional media based microfluidics for the detection of analytes using a variety of fluidic samples. Typically, paper based media, referred to as microfluidic paper analytical devices (MPAD), have been patterned by layering hydrophobic chemistries on hydrophilic media creating physical barriers to contain wicking or capillary fluidic motion. To create microchannel barriers, a variety of technologies and chemistries have been employed.

For example, PCT Patent Application Publication No. WO 2010/022324 discloses methods of patterning hydrophobic materials onto hydrophilic substrates as well as methods of impregnating hydrophilic substrates with a hydrophobic material. U.S. Patent Application Publication No. 2009/0298191 discloses methods of patterning porous media to provide lateral flow and flow-through bioassay devices wherein the devices include a porous, hydrophilic medium and a fluid impervious barrier comprising a polymerizable photoresist, with the barrier substantially permeating the thickness of the porous, hydrophilic medium and defining a boundary of an assay region (containing an assay reagent) within the porous, hydrophilic medium. Other developments have used polystyrene, wax-based and superhydrophobic patterning processes to form physical microchannel barriers defining hydrophilic channels or regions.

U.S. Patent Application Publication No. 2011/0123398 discloses three-dimensional microfluidic devices that include a plurality of patterned porous, hydrophilic layers and a fluid-impermeable layer disposed between adjacent patterned porous, hydrophilic layers. Each patterned porous, hydrophilic layer is disclosed to include a fluid-impermeable barrier that substantially permeates the thickness of the porous, hydrophilic layer and defines boundaries of one or more hydrophilic regions within the patterned porous, hydrophilic layer. The fluid-impermeable layer has openings that are aligned with at least part of the hydrophilic region within at least one adjacent patterned porous, hydrophilic layer.

U.S. Patent Application Publication No. 2008/0025873 discloses microfluidic devices that include a substrate and a non-valve capillary mechanism, as well as a reservoir and one or more channels leading to the reservoir, wherein the non-valve capillary mechanism is within the reservoir, and prevents fluid delivered to the reservoir from wicking from the reservoir into the channels. A delivered fluid is hydrophilically attracted to and retained within the reservoir.

In other devices, processes employed to delay fluidic motion have been based on abruptly changing the physical geometry of the microchannels through enlargement of the microchannel. Assembling two or more multiple delay valves to form a joined region where at least two fluids were required to advance the fluid created a temporary trigger valve having a longer delay time. In still other devices, paraffin wax has been used to restrict wicking through a control point between layers.

Although these devices may prevent undesired mixing of fluids between reservoirs and adjacent channels, the need remains for the ability to control mixing of fluids with a microfluidic valve that does not employ mechanical or electrical mechanisms to control the valve thereby restricting the utility of the device and its stand alone use.

SUMMARY

In accordance with an embodiment, the invention provides a microfluidic valve system that includes a matrix, a hydrophilic acceptor region a hydrophilic transfer region, and a hydrophobic gap between the acceptor region and the transfer region.

In accordance with an embodiment, the invention provides a microfluidic non-mechanical valve that includes a hydrophobic material permeating the thickness of hydrophilic media defining a hydrophobic channel separating a hydrophilic transfer region containing a transfer agent and a hydrophilic acceptor region, wherein the microfluidic non-mechanical valve is opened by wetting the transport agent hydrophilic staging region allowing fluid movement across the hydrophobic gap between the hydrophilic transfer region and the hydrophilic acceptor region.

In accordance with an embodiment, the invention provides a method of making a microfluidic valve on a matrix, comprising the hydrophilic acceptor region and a hydrophilic transfer region. The method includes the step of containing a transfer agent separated by a hydrophobic gap, wherein a transfer agent is deposited on hydrophilic transfer region.

In accordance with various further embodiments of the present invention, a non-mechanical valve is provided that may be opened solely by using microfluidic properties contained within the device upon application of a liquid sample to be tested.

In accordance with certain embodiments, a physical hydrophobic barrier may be created by applying hydrophobic materials, including, but not limited to, photoresist, polystrene, PDMS and waxes on a hydrophilic matrix that define hydrophilic regions including, but not limited to, microchannels and reservoirs.

The term valve or microfluidic valve or diode refers herein to a non-mechanical device to control the flow of a fluid created by positioning a hydrophobic region between two hydrophilic regions. A valve is constructed by placing a transfer agent, such as a surfactant, on the hydrophilic region that controls opening the valve. The valve is opened when a fluid solubilizes the surfactant allowing fluid to pass through the hydrophobic region to the acceptor hydrophilic region. In this manner, the value operates in only one direction. Once opened, fluid flow is able to go in both directions. The arrows in the figures indicate the fluid flow of the valve.

In accordance with further embodiments, virtual hydrophobic barrier is created by altering the surface wettability properties of the matrix that define hydrophobic regions and hydrophilic regions including, but not limited to, microchannels and reservoirs. The surface wettability properties relate to rendering the matrix to be more conducive to fluid movement.

BRIEF DESCRIPTION OF THE DRAWINGS

The following description may be further understood with reference to the accompanying drawings in which:

FIGS. 7A-7B show illustrative diagrammatic views of a delay valve in accordance with an embodiment of the invention, and time-sequential photographs of the synchronized wicking of fluid in two delay valves;

FIGS. 8A-8B show illustrative diagrammatic views of a sequential loading system in accordance with an embodiment of the invention, and time-sequential photographs of fluid A and fluid B moving in such a system;

FIGS. 9A-9G show illustrative diagrammatic views of three-dimensional paper-based microfluidic devices in accordance with embodiments of the invention, as well as a scanned cross-sectional view taken along line 9G-9G of FIG. 9F;

FIGS. 13A-13D show illustrative diagrammatic views of a sequential loading valve in accordance with an embodiment of the invention, layers of such a device, top layers thereof at three consecutive times (as well as intensity graphs thereof), and a size comparison view;

DETAILED DESCRIPTION

In accordance with an embodiment, the invention provides a microfluidic valve that is opened without any use of mechanical or physical mechanisms. The microfluidic valve contains a transfer agent, such as a surfactant, that is deposited in a selected hydrophilic region and that will serve as a mechanism to open a valve allowing fluidic transfer from a hydrophilic region across a hydrophobic gap or channel to another hydrophilic region. The valve can be patterned using different methods on mediums together with channels and input or output terminals. In accordance with certain embodiments, the present invention teaches a variety of more complex valves such as delay valves and trigger valves to provide a versatility of the desired time for fluids to be released or mixed. Combinations of valves were configured into two-dimensional (2D) sequential devices that were capable of exchanging two or more fluids. A further improvement of sequential devices, valves were configured into three-dimensional (3D) sequential valves to transfer fluids in three dimensions between 2 or more layers using multiple fluids as required for more complex diagnostic capabilities and reducing the size of the device.

Prior micro-fluidic devices have employed various hydrophobic materials, including photoresist, polystrene, PDMS and waxes to pattern the surface of a paper matrix to form physical solid microchannels for paper based microfluidics. In accordance with certain embodiments of the present invention, the applicants departed from applying hydrophobic materials to form physical hydrophobic barriers on the surface of the paper matrix, and instead provide a novel approach where the surface constitution of its cellulose fibers is covalently modified into hydrophilic or hydrophobic regions thereby creating virtual walls formed by patterned wettability of paper.

In one scheme, the initial step was to alter the surface properties of cellulose from having terminal hydroxyl groups, hydrophilic, to terminal vinyl groups, hydrophobic. Once the hydrophobic surface was created, hydrophilic areas were patterned onto the hydrophobic vinyl surface using reactive thiol-ene click chemistry and were activated using UV light. Only those areas exposed to UV light were grafted covalently, thereby changing their surface properties from hydrophobic to hydrophilic resulting in an easily patterned surface containing virtual walls as a novel alternative to traditional physical hydrophobic walls.

Figure 1:
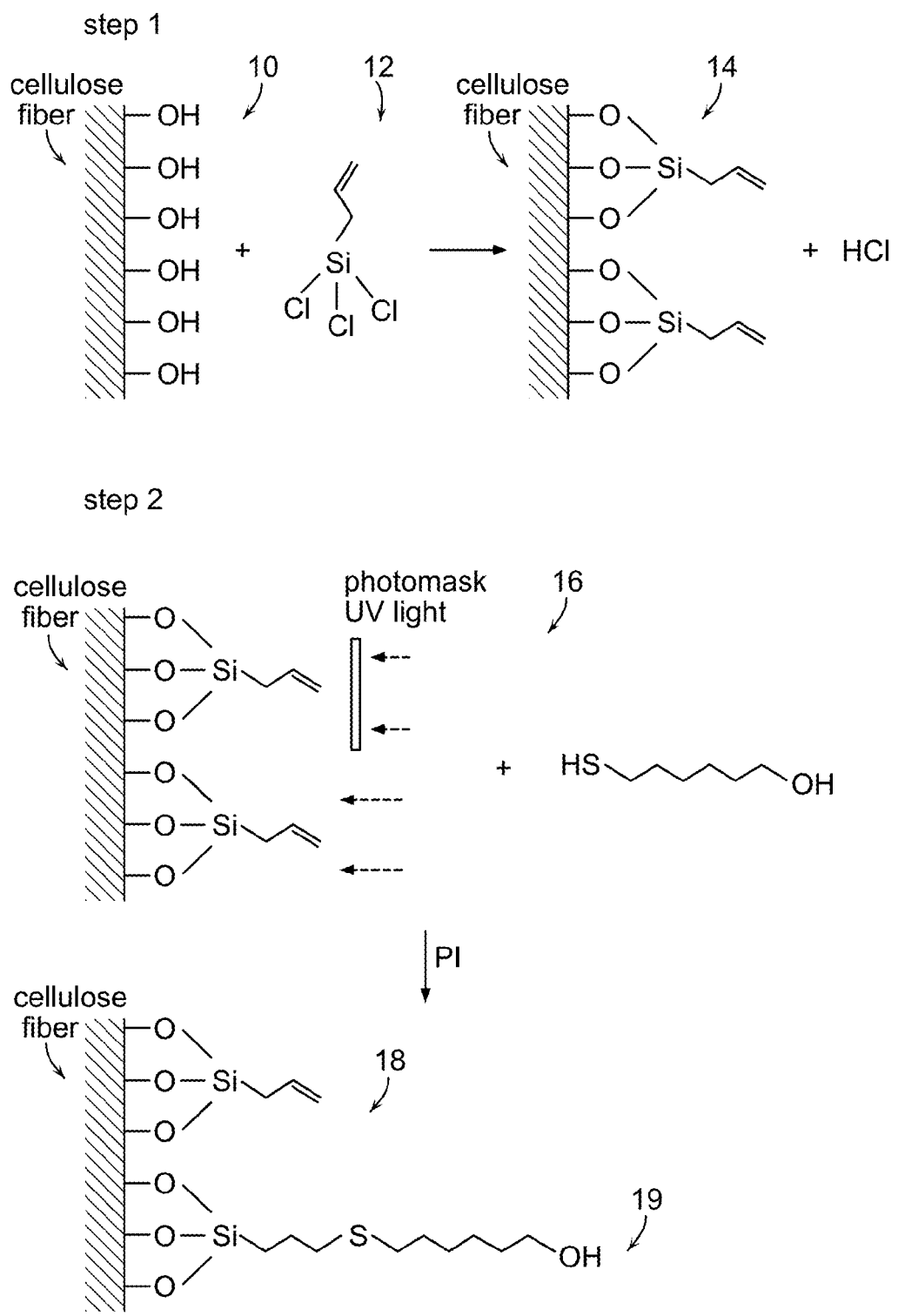
FIG. 1 shows an illustrative diagrammatic view of a process of photopatterning layered paper in accordance with an embodiment of the invention using a photo-initiator.

For example, FIG. 1A shows diagrammatically (at 10), cellulose fiber having exposed oxygen hydrogen atoms (OH) that are then combined with silicone tri-chlorine (Si—$Cl_3$) as shown at 12 to produce cellulose fiber having molecular exposures of silicone (Si) as shown, in an hydrochloric acid (HCl) as shown at 14. As shown at 16, when a photomask is applied to a portion of the cellulose fiber (as shown at 16) and UV light is impinged on the exposed regions, some areas remain hydrophobic (as shown at 18), while others again become hydrophilic (as shown at 19).

A surprising result of this approach is that the lack of a physical barrier to create hydrophilic regions provides more flexibility in fabricating new processes and utilities for paper based microfluidics such as a microfluidic non-mechanical valve described herein. It is also taught that the paper based microfluidic application or device may use a virtual barrier region in conjunction with a physical barrier region to form yet more complex applications and devices.

The chemistries used to produce patterned wettability in a porous substrate matrix depend on initial surface properties of the matrix, coupling agents that link a hydrophilic or hydrophobic terminal to the surface, and the patterning methods. The substrate matrix is not limited to paper and either hydrophilic or hydrophobic porous substrates may be used. Hydrophilic porous substrates include cellulose, glass microfibers, cotton, wool, silk, and other hydrophilic porous materials. Hydrophobic porous substrates include polyvinylidene fluoride, nylon, nitrocellulose, polytetrafluoroethylene, mixed cellulose ester, and other hydrophobic porous materials. For the hydrophobic substrates, printing or stamping a solution of the coupling reagents containing hydrophobic terminals may be employed to form a desired hydrophobic or hydrophilic pattern.

Alternatively, the hydrophilic substrates may be first converted to be uniformly hydrophobic by the coupling reagents, and subsequently the hydrophobic terminal of the coupling reagents may be further coupled and patterned with another molecule to introduce hydrophilic terminals. A coupling reagent is a molecule that has at least one functional terminal that covalently bonds to the substrate. Examples of functional terminals include trichlorosilane and trimethoxysilane, which react with hydroxyl groups of the substrate. Once the coupling reagent bonds to the substrate, its terminal group determines the local wettability. Terminals may be either hydrophobic including alkanes and fluorocarbons or hydrophilic including hydroxyl and polyethylene glycol (PEG). Examples of coupling chemistry include thiol-ene click chemistry and azide alkyne Huisgen cycloaddition.

Figure 2A:
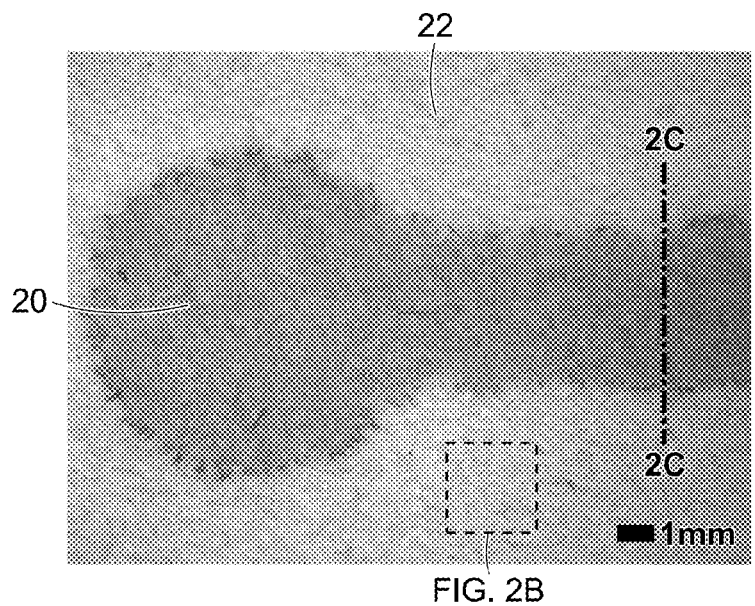
FIGS. 2A-2C show an illustrative microphotographic views of a hydrophilic pattern on a hydrophobic surface, the contact angle of a water droplet on the hydrophobic surface, and a cross-sectional view along the line 2C-2C of FIG. 2A.
Figure 2B:
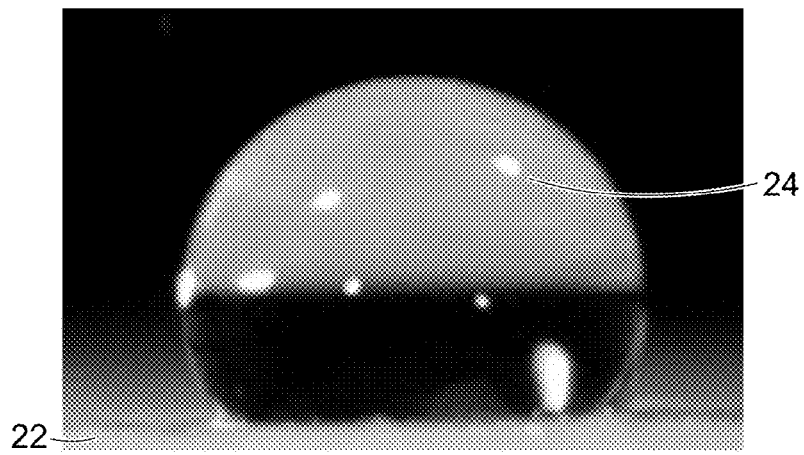
Figure 2C:
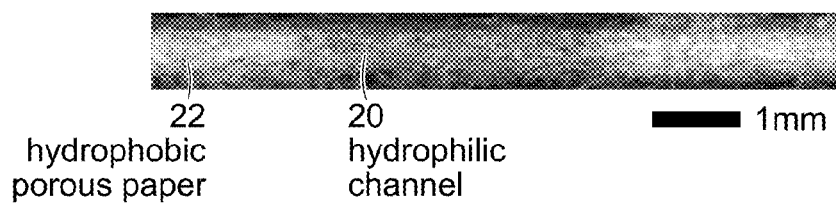
Figure 3A:
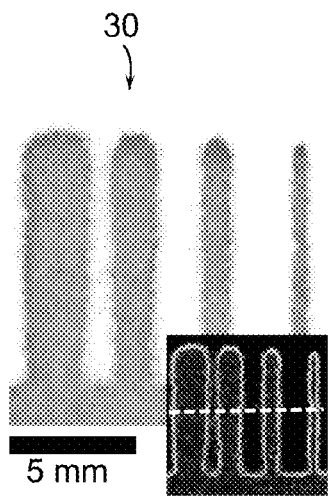
FIGS. 3A-3C show illustrative diagrammatic views of photo-patterned hydrophilic channels with decreasing width, hydrophobic gaps with decreasing widths, and a graphical representation of designed width verses reproduced width.
Figure 3B:
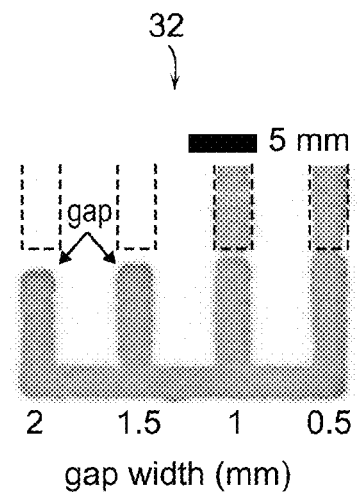
Figure 3C:
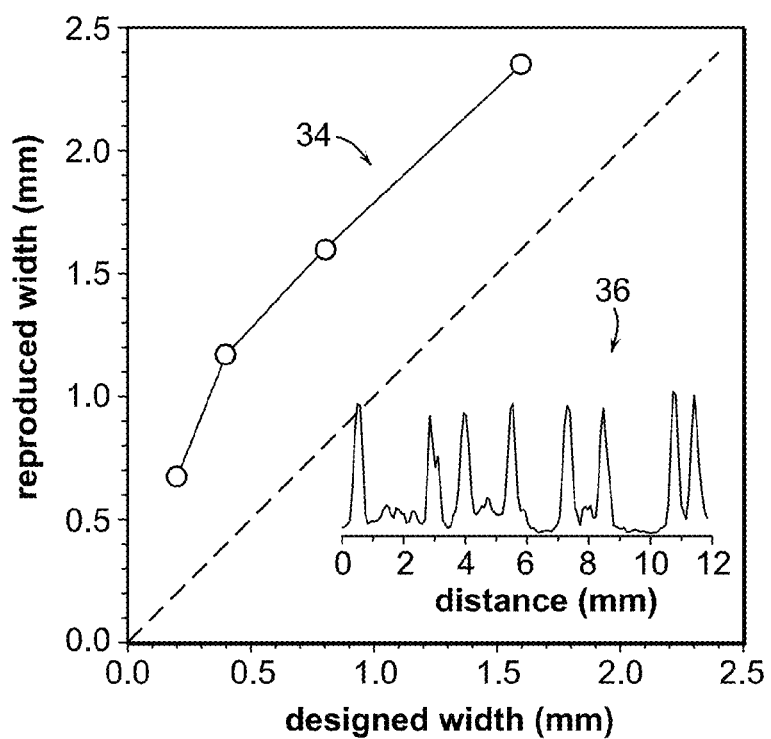

FIG. 2A shows at 20 a hydrophilic channel on a hydrophobic porous paper 22, and FIG. 2C shows a cross-sectional view of the paper 22 along the line 2C-2C thereof. FIG. 2B shows a water droplet 24 on a portion of the hydrophobic surface 22. FIG. 3A shows at 30 hydrophilic channels with decreasing width to the right. FIG. 3B shows at 32 decreasing gap widths of about 2 mm, 1.5 mm, 1.0 mm, and 0.5 mm. FIG. 3C shows at 34 a correlation of designed width verses reproduced width in mm, as well as distance of reproduced width shifts from the designed width of 1.5 mm of the functioning gap in FIG. 3B as shown at 36.

Figure 4A:
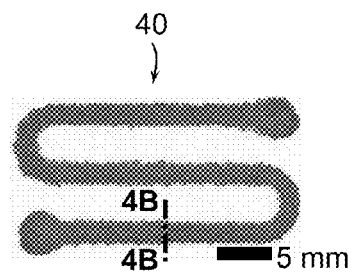
FIGS. 4A-4D show illustrative diagrammatic views of an S-shaped channel produced in accordance with an embodiment of the invention, a photomicrographic taken along line 4B-4B of FIG. 4A, time-sequence photomicrographs on a tri-ethylene glycol (TEG)-grafted surface, and time-sequence photomicrographs on a MU tri-ethylene glycol (MUTEG)-grafted surface.
Figure 4B:
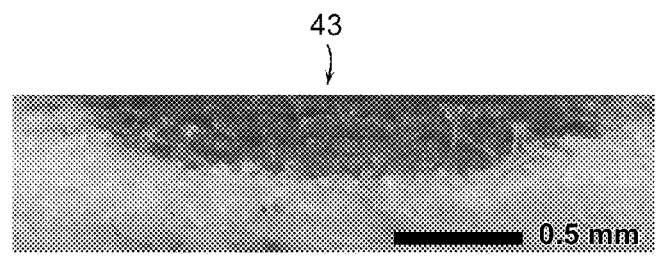
Figure 4C:
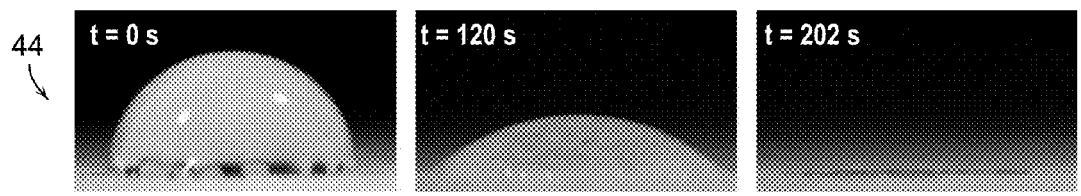
Figure 4D:

FIG. 4A shows at 40 an S-shaped channel produced in accordance with an embodiment of the invention, and FIG. 4B shows at 42 a cross-sectional area of FIG. 4A taken along line 4B-4B thereof. FIG. 4C shows at 44 a time sequence (t=0 s, t=102 s and t=202 s) on a tetra (ethylene glycol) grafted surface, and FIG. 4D shows at 46 a time sequence (t=0 s, t=0.6 s and t=1.2 s) on an MU tetra (ethylene glycol) grafted surface.

In a second aspect of the invention, the applicants have resolved prior constraints in developing a self-contained microfluidic diagnostic device that is able to hold or prevent passive microfluidic transfer or wicking until such time the transfer or wicking is desired. In the past, microfluidic devices that are able to delay or facilitate microfluid transfer from one region to another, typically through a microchannel, were limited by requiring external equipment such as capillary pumps, electronics or other devices or physical structures in the microchannels as described previously herein. The present invention does not require any of these additional equipment or physical structures to stop or delay microfluid transfer from one region to another.

In accordance with an embodiment of the present invention, a transfer agent is deposited or applied in a selected hydrophilic region that will serve as a mechanism to open a valve allowing fluidic transfer from this hydrophilic region across a hydrophobic gap or channel to another hydrophilic region. The area where this action occurs is referred to as a hydrophilic transfer region or microfluidic non-mechanical valve. The microfluidic non-mechanical valve is opened when a fluid is applied or delivered into the hydrophilic transfer region and the transfer agent, such as a surfactant, is solubilized or dissolved in the fluid and the agent alters the wettability of adjoining hydrophobic area allowing the fluid to transfer to the other hydrophilic region.

Figure 5A:
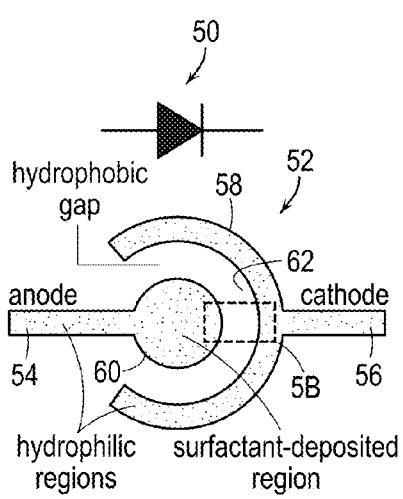
FIGS. 5A-5D show illustrative diagrammatic views of a non-mechanical microfluidic valve in accordance with an embodiment of the invention, a microscopic schematic of the dashed area shown in FIG. 5A, time-sequential photographs showing the fluid in two reversely configured valves, and photograph of a non-mechanical microfluidic valve with human blood serum.

For example, FIG. 5A shows at 50 a representative schematic of a valve of the invention, and at 52 an embodiment of such a microfluidic valve. In particular, the valve 52 includes an anode 54 and a cathode 56, with a gap 652 between a circular portion 60 of the anode 54, and a larger circular portion 58 of the cathode 56. As further shown at 64, when water contacts a surfactant 66, cellulose fiber permits the liquid to travel across the hydrophobic gap as shown, with the proceeding of the meniscus shown by arrows at 72. FIG. 5C shows the one way directionality of the valve, wherein two valves 76, 78 are coupled to a receiving area 80. One valve (76) is oriented to permit fluid to reach the spot 82, while the other valve (78) is positioned in a the opposite orientation, and does not permit fluid to reach the spot 84 as shown in the time sequence photographs shown in at 74 in of FIG. 5C. FIG. 5 D shows at 86 another non-mechanical microfluidic device of the invention with human blood serum.

The surprising and novel feature of this valve is that it is directional in function. The valve is not opened when the fluid enters into the hydrophilic acceptor region that does not contain the transfer agent (e.g., valve 78 of FIG. 5C). This function allows a fluid to be held in the reservoir until the fluid is to be released. Transfer agents include surfactants that are either nonionic or ionic surfactants. Ionic surfactants include anionic, cationic and Zwitterionic surfactants. Examples of nonionic surfactants include polyoxyethylene glycol alkyl ether, polyoxypropylene glycol, alkyl ether, polyoxyethylene glycol sorbitan alkyl ester (polysorbate), polysorbate 20 (Tween 20), polyoxyethylene glycol octylphenol ether (Triton X-100), glycerin, polyoxyethylene glycol alkylphenol ether, polyvinyl alcohol, polysorbate, glycerol alkyl ester, polyvinylpyrrolidone, polyethylene glycol, glucoside alkyl ether and other nonionic surfactants.

In the third aspect of the present invention, the non-mechanical valve can be used to construct complex diagnostic devices requiring the use of multiple diagnostic agents and steps to perform the desired assay. Assembling valves and valve variants in an array of sequential-loading steps is a powerful tool for performing complicated biological assays. As one example of a multiple step diagnostic assay is one that requires two antibodies to recognize an infectious disease where the first antibody binds to a specific epitope on the infectious microbe, such as a pathogenic virus, bacterium or fungi, as a trap bound to paper, and then a second antibody coupled to an indicator agent binds to the antibody trapped infectious microbe. In one set of applications that indicator agent may be visible to the naked eye directly under normal or UV exposed light or indirectly if the indicator is only visible upon a secondary reaction. These steps may require incubation times to be fully reactive, such as antibody binding or the development of a colored analyte using an enzymatic reaction. Other detection systems include emission of fluorescence, phosphorescence or luminescence. In yet other embodiments, systems requiring equipment for detection can use optical, magnetic, radiological, and electrical indicators. In some cases, the detection equipment may be portable and can be linked to a diagnostic center via a communication link, either satellite, wireless, or directly to the internet, that is able to perform the analysis based on the detection of the analyte.

To construct a device having sequential-loading steps it was necessary to design more complex valves. Two such embodiments are a trigger valve and a delay valve. In designing a trigger valve, the valve provides for a fluid to mix with a liquid sample or another fluid in a timed period. In contrast to previous devices that require support equipment to perform mixing, in the present invention the fluid to be mixed is held until it is released by the liquid sample or fluid to undergo mixing. The length of the channel can be adjusted to control the time for release of the liquid sample.

Figures 6A, 6B:
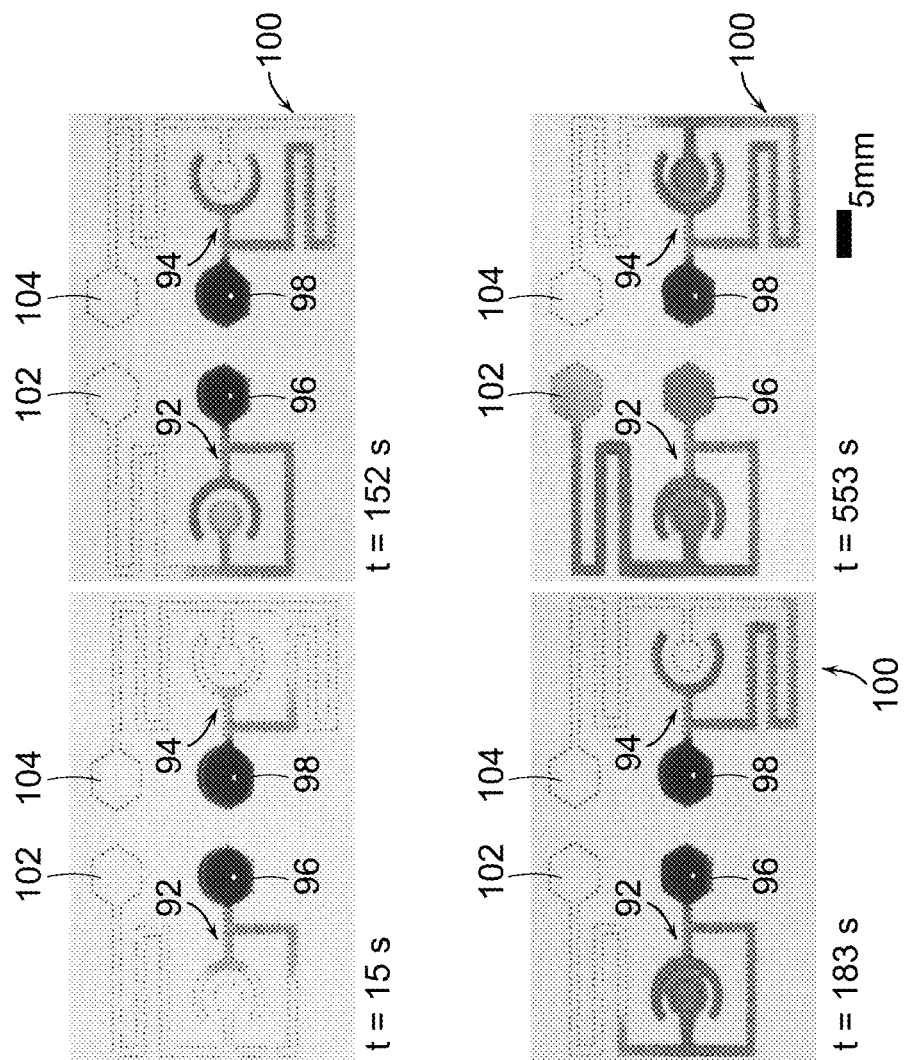
FIGS. 6A-6B show illustrative diagrammatic views of a trigger valve in accordance with an embodiment of the invention, and time-sequential photographs showing gated fluid released by a triggering of fluid.

FIG. 6A shows at 90 a schematic view of such a device, and FIG. 6B shows two valves 92, 94, one of which is coupled to a path that includes a delay element 100. As shown in the time sequence photographs (t=15 s, t=152 s, t=183 s and t=553 s), the delay unit 100 causes fluid to reach the spot 102 well prior to the time when fluid will reach the spot 104. The trigger valves can be used in a parallel or a series array depending upon the desired mixing reactions.

In another configuration, a delay valve is provided, which may be used to delay the release of a fluid by the length of the channel, denoted the bridging channel, between the trigger valve and the applied sample. FIG. 7A shows at 110 a schematic view of such a device, and FIG. 7B shows a system that includes one valve 114, but also a delay unit 112 in advance of the valve. Once the fluid from spot 116 reaches the valve 114 (as shown at t=139 s), the valve 114 is opened, permitting a fluid at 118 to migrate with the fluid from the spot 116 to the spot 120. In this way, the fluids may be mixed at desired times. In a specific biological assay, it is preferable to delay the mixing with the next fluid for 1 second, 10 seconds, 30 seconds, 1 minute, 5 minutes, 10 minutes, 20 minutes, 30 minutes, 1 hour or any desired time period.

In the one such embodiment of sequential-loading steps, a trigger valve and a delay valve are assembled in the array where a selected area, referred to as the reaction spot, can be used as a central point to pass fluids sequentially. FIGS. 8A-8B, for example, show a system (schematically at 122 in FIG. 8A) that includes two reserves of fluid (fluid A as shown at 124, and fluid B as shown at 126). After a desired period of time, the fluid B is permitted to mix with fluid A and then both reach the absorption terminal 128 together.

The valve may be assembled in two-dimensional (2D) and three-dimensional (3D) assay devices to control biological reactions, such as antibody or receptor binding, washing and detection steps. A three-dimensional device contains two of more layers of a porous substrate that is uniquely patterned with hydrophobic and hydrophilic regions to facilitate the preferred directional wicking of the fluid. In addition, a separating layer is placed in between porous layers is impermeable to fluids except in desired regions to transferring fluids from one layer to the other layer.

The transfer region is either a hydrophilic region or a hydrophobic region. In addition, the shape and the size of the transfer region are selected based upon the desired attributes of the diagnostic device. In a working three-dimensional device, in a hydrophobic region, the fluid can pass between the layers from one aligned hydrophilic to another hydrophilic region to complete the desired assay. In another embodiment, a fluid is released by a trigger valve contained in a layer above or below rather than on the same layer. More precisely, the hydrophobic region is aligned within the impermeable separating layer in the desired transfer region.

FIGS. 9A-9F show illustrative diagrammatic views of three-dimensional paper-based microfluidic devices in accordance with various embodiments of the invention. FIGS. 9A, 9C and 9E show at 130, 132 and 134 various layers separated for illustration, and FIGS. 9B, 9D and 9F show top views of the top layers 140, 142 and 144. FIG. 9G shows at 136 a scanned cross section taken along line 9G-9G of FIG. 9F.

The surfactant is placed either in the above layer or the below layer depending upon directional flow desired. As shown at 150 in FIG. 10B (FIG. 10A shows a schematic of the valve), a valve is provided using first layer 152 and a second layer 154 separated by a tape that includes a disc and an aperture. The fluid first flows in a direction as shown in the top view of FIG. 10C, and later flows in a direction as shown at in the bottom view of FIG. 10C. The fluid flows to the surfactant contained on the bottom layer beneath the hydrophobic disc. The solubilized surfactant fluid (158) is able to pass through the hydrophobic disc, thereby opening the valve for fluid to pass to the upper hydrophilic layer. The thickness of the hydrophobic layer may vary to any thickness between 1 micron to 1000 microns depending up the desired application. Therefore, a detection of the analyte can be performed on a layer separate from the one where the initial sample was loaded.

Figure 11A:
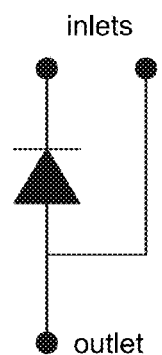
FIGS. 11A-11D show illustrative diagrammatic views of a fluidic trigger valve in accordance with an embodiment of the invention, layers of such a device, and top and bottom layers thereof.
Figure 11B:
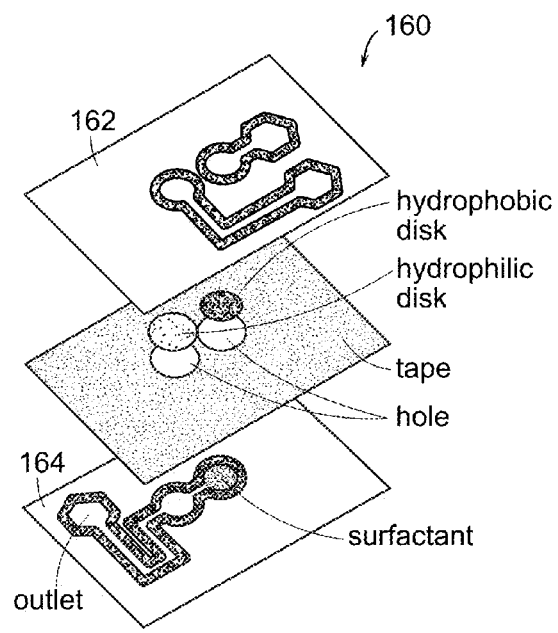

As shown at 160 in FIG. 11B (FIG. 11A shows a schematic of the valve), another valve is provided using first layer 162 and a second layer 164 separated by a tape that includes multiple discs and apertures. Triggering fluid flows in a direction that opens the valve so that both the triggering fluid and the gated fluid may be combined.

Figures 12A, 12B, 12C:
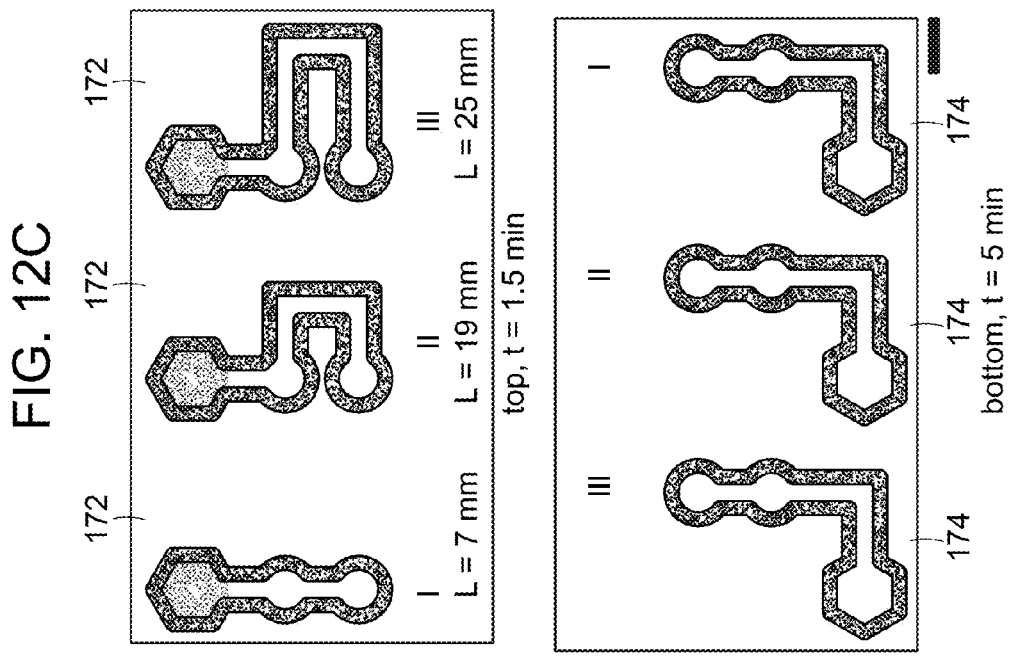
FIGS. 12A-12C show illustrative diagrammatic views of a fluidic delay valve in accordance with an embodiment of the invention, layer of such a device, and top and bottom layers thereof.

As shown at 170 in FIG. 12B (FIG. 12A shows a schematic of the valve), another valve is provided using first layer 172 and a second layer 174 separated by a tape that includes multiple discs and apertures, including a hydrophilic disc and a hydrophobic disc. The system provides a fluidic delay valve with three channel lengths of delay.

Even more preferably for complex diagnostic assays, the 3D devices may be designed to operate with two or more fluids as shown in FIGS. 13A-13D. As shown at 180 in FIG. 13B (FIG. 13A shows a schematic of the valve), another valve is provided using first layer 182 and a second layer 184 separated by a tape that includes multiple discs and apertures, including a hydrophilic disc and a hydrophobic disc, as well as an absorbent back layer 186, separated by a further tape A further improvement over the 2D device is the reduction of the diagnostic device to approximately the size of a postage stamp, as shown in FIG. 13D. The color graphs at 190, 192, 194 show the color of fluids (yellow and blue) at the spot 196 at times t=3 min, t=8 min and t=12 min.

A sequential-loading system can be used to detect a wide variety of biologically desired targets that are represented by the entire or partial molecule such as a metabolite, peptide, carbohydrate, lipid, nucleic acid or other selective detector molecule that can be selectively bound or interact with a companion detector molecule. Nucleic acid can be either deoxyribonucleic acid (DNA) or ribonucleic acid (RNA). The target analyte will be "trapped" by an antibody, receptor, nucleic acid, chelator, or another molecule capable of selectively binding or interacting with the target analyte at a detection spot or region. Once the target analyte is bound at the detection spot, a secondary detector molecule is linked directly or indirectly to a detection agent and is an antibody, receptor, nucleic acid, chelator, or another molecule capable of selectively binding or interacting with the target analyte. The secondary detector molecule contains a detection agent such as enzyme/enzyme substrate or gold, fluorescence, phosphorescent, and luminescent tag or marker. More preferably, the detection agent is an agent producing a visible color that does not require a device to detect the reaction.

The click-chemistry described here or other chemistries can be used to covalently immobilize to the media a trap molecule that can selectively bind or interact with the analyte. Examples of covalent bonds include esters, amides, imines, ethers, carbon-carbon, carbon-nitrogen, carbon-oxygen or oxygen-nitrogen bonds. Alternatively, the trap molecule can be non-covalently adsorbed to the media provided that the dissociation rate is very low under the conditions used. The trap molecule can be a metabolite, peptide, carbohydrate, lipid, nucleic acid, molecularly imprinted polymers, inorganic compounds, or another selective analyte. Typically, the trap molecule is located in a position where fluids are mixed, and more preferably, sequentially mixed that provide the time for incubation and subsequent binding.

The present invention anticipates that in some applications such as with biological samples, further surface modification of hydrophilic channels may be required to reduce nonspecific adsorption of proteins in biological samples. Specifically, it is desirable to reduce non-specific binding and interactions between the media substrate and small and large molecules contained in the clinical or environmental sample. One such approach is to replace the hydroxyl-terminated thiol by polyethylene-glycol (PEG)-terminated thiol as the reactant in the click chemistry. PEG is a known family of hydrophilic groups that reduce nonspecific protein adsorption at water-solid and water-oil interfaces.

In the preferable embodiment of the invention is the application of a sample that does not require any prior treatment of the clinical fluid or environmental sample to remove contaminating or obstructing material such as dust, dirt, macroparticles, or microparticles, including cells or biological aggregates or other biological impurities or remove specific proteins, nucleic acids, inorganic or organic compounds. It is anticipated that a sample may be treated using a variety of protocols to remove the contaminating or obstructing materials, such as subjecting the fluid to filtering, centrifugation, absorption or other methods. The preferred use is for the stand-alone device to incorporate as part of the device, a filtering or absorption element to remove or retain the undesired contaminating or obstructing material.

The Examples below are illustrations of representative devices having a selected function but are not limited in scope to their design and the components used in the device such as the combinations of materials used in the design of the devices, methods for imprinting hydrophobic and hydrophilic regions, and the size, types, materials and position of the valve or valves using in the devices.

EXAMPLE 1

Patterning of Virtual Barrier Regions on a Paper Matrix

Paper is primarily composed of cellulose fibers that are rich in terminal hydroxyl groups. The wettability of a paper sheet was patterned in a two-step reaction (as discussed above with reference to FIG. 1). In the first step, cellulose fibers were primed by a trichlorosilane with a vinyl terminus (a click chemistry thiol-ene). The condensation reaction between the trichlorosilane and the hydroxyl groups grafted the vinyl terminus onto the cellulose fibers. Vinyl-terminated trichlorosilanes are known to form hydrophobic monolayers on a variety of surfaces. As used herein, the vinyl terminus rendered the entire surface and the bulk of the paper sheet hydrophobic.

In the second step, the vinyl terminus further reacted with a thiol in order to introduce a hydrophilic group (in this scheme, a hydroxyl group) to the terminus. For this reaction, thiol-ene "click chemistry" was initiated by a photoinitiator (PI) using UV light. Those areas that were designated to remain hydrophobic regions were masked to prevent photoinitiation. Therefore, the hydrophilic group was only grafted covalently in the UV-exposed regions, whereas the masked region remained hydrophobic. Similar schemes using the thiol-ene chemistry have been reported for patterning wettability or proteins on surfaces.

Using this scheme, millimeter-scale fluidic channel was fabricated using 6-mercapto-1-hexanol as the hydrophilic terminal molecule (see FIG. 2A). In the fabricated device, the start of the channel was round to provide for sample application. In this illustration, dye-containing water (orange in color) was applied to the start region and it was observed that water was absorbed quickly and spread quickly along the channel. The contrast of color clearly showed the edge of the hydrophilic region patterned in the layered hydrophobic paper.

The photomask was printed on a transparency film by an office laser printer. The profiles of the patterned paper were printed on cellulose paper. Natural cellulose paper sheet (0.6 mm in thickness, obtained from Invitrogen, Carlsbad, Calif.) was soaked in solution of allyltrichlorosilane for 6 hours, rinsed by isopropyl alcohol in an ultrasonic bath for 15 min, and air-dried at room temperature in a fume hood. Thiol solution (either 6-mercapto-1-hexanol or MUTEG) was then pipetted onto the paper sheet. The paper sheet was attached to the photomask, sandwiched firmly between two cover glasses (1 mm in thickness), and exposed using a UV lamp for 240 seconds (ELC-500, Electro-Lite Corporation, Danbury, Conn.).

During the exposure, the backside of the paper sheet was protected from UV light. After exposure, the exposed paper sheet was placed on a stack of paper towel, washed by 95% (v:v) of ethanol with 5% (v:v) of water, and dried on a hotplate at 70° C. for an hour. Finally, 0.5 µl of a surfactant solution (Tween-20, 3% in ethanol, w:w), the transfer agent was deposited to the circle terminal of the hydrophilic transfer region. The layered paper was heated a second time to 70° C. on a hotplate to evaporate the solvent.

To visualize hydrophobicity of the masked, unexposed region, the vertical profile of a 5 μl water droplet was captured resting on the surface (see FIG. 2B). As a strong evidence of hydrophobicity, the contact angle of the droplet and the paper surface was found to be 118.3±2°. In comparison, the advancing contact angle of a water droplet on a smooth surface packed with self-assembled vinyl termini are in the range of 101° to 107°.

The hydrophilic channels were imaged using a stereoscopic zoom microscope (Nikon SMZ800) attached with a CCD camera (model SPOT Insight 2MP rewire Color Mosaic, Diagnostic Instruments, Sterling Heights, Mich.). The fluidic valves and valve systems were imaged using a digital single-lens reflex camera (Canon).

A water droplet resting on the hydrophobized paper was imaged by a stereoscopic zoom microscope with a 45 mirror attached in front of the objective lens. The water contact angle θ was determined by two geometric parameters (measured in pixel units), $\theta = 90° \pm 180°/\pi \arcsin h/r$, where r and h were the radius of the spherical profile of the droplet and its center distance from the paper surface, respectively. The uncertainty of contact angle measurement δθ was associated with the uncertainty of each individual geometric parameter, δr and δh, measured from the image. Specifically, δθ was calculated by the root-sum-square expression, $\delta\theta = [(\delta\theta/\delta r(\delta r))^2 + (\delta\theta/\delta h(\delta h))^2]^{1/2}$. In this study, δr and δh were approximately 4 pixel units. Microphotographs were recorded, using the CCD camera and an illuminator (model NI-150, Nikon).

The UV exposure not only produced the hydrophilic region (see FIG. 2A) on the paper surface but it also caused the reaction within the bulk of the paper. It was found that the organic solvent that was absorbed in the paper during fabrication altered the paper from being opaque to being semi-transparent. These changes promoted the penetration of UV light in the bulk. Again, FIG. 2C shows the cross section of the hydrophilic channel along the dotted line in FIG. 2A. The liquid (colored) is distributed from the top to the bottom of the channel. Therefore, the back side of the channel was also wetted.

The uncollimated UV light determined the resolution of hydrophilic patterns re-produced from the photomask. In FIGS. 3a and 3b, a series of hydrophilic channels (wetted by dye-containing water) and hydrophobic gaps are shown with decreasing width, respectively. By using Image J™ software, the edges of the channels in the inset in FIG. 3a were highlighted. A 0.2-mm wide line in a photomask produced a 0.67-mm wide channel shown as the first vertical channel on the right (FIG. 3a). Line patterns that were less than 0.2 mm in width did not produce channels. Shown in FIG. 3b, a 1.50-mm wide (UV opaque) block in the photomask produced a functioning hydrophobic gap.

Further reducing the gap width in the photomask resulted in the leaking of water through the gap. FIG. 3c plots the reproduced width of each channel measured as the peak-to-peak distance in the profile (inset in FIG. 3C) along the dashed line in FIG. 3A. The reproduced width shifts from the designed width by 0.47 to 0.8 mm. The shift suggests that a safe distance between two lines in a photomask should be longer than 1.6 mm, which is consistent with the minimum designed width (1.5 mm) of the functioning gap in FIG. 3B.

EXAMPLE 2

Varying the Degree of Hydrophilicity

In addition to the photopatterning, the chemistry described herein enabled varying the degree of hydrophilicity by the selection a thiol with other termini. In general, a monolayer constituted by self-assembled, oligo (ethylene glycol)-terminated, pure alkanethiols exhibits reduced hydrophilicity, compared to a monolayer constituted by similarly organized, hydroxyl-terminated, pure alkanethiols. It was found that the hydroxyl terminus of 6-mercapto-1-hexanol was disorderly organized and projected outwards from cellulose fibers. These projections largely determined the hydrophilicity of the patterned channels. It was found that by grafting MUTEG $(HS(CH_2)_{11}(OCH_2CH_2)_4OH)$, an alkanethiol with a less hydrophilic tetra-ethylene-glycol (TEG) terminus, the hydrophilicity was significantly reduced within the patterned region.

Using this MUTEG molecule, an S-shape hydrophilic channel was fabricated on layered hydrophobic paper (with reference to FIG. 4A). The cross section of the channel in FIG. 4B was significantly thinner than that one of FIG. 2C. However, water wicking along the channel could not wet the reverse side of the layered paper. It was observed that, unlike the hydroxyl-grafted channel, water spread slowly along the TEG-grafted channel. The slow spread of water in the TEG-grafted paper matrix resulted in the low rate of water absorption when a water droplet was fed onto the paper surface.

To test water absorption, two $2\times2$ $cm^2$ hydrophilic areas grafted with TEG (see FIG. 4C) or hydroxyl termini (see FIG. 4D) were prepared. The water absorption of the TEG-grafted surface was roughly 200-times slower than that of the hydroxyl-grafted surface. A 5 μL water droplet was absorbed in 202 seconds into the TEG-grafted compared to one second into the hydroxyl-grafted surface. The reduced rate of water absorption strongly suggests that TEG-grafted paper is less hydrophilic. It was also found that the rate of water adsorption of the hydroxyl-grafted surface was similar to that of the native layered paper.

EXAMPLE 3

A Non-Mechanical Microfluidic Valve

A non-mechanical microfluidic valve consists of a group of hydrophilic patterns wherein a hydrophilic transfer region is separated from a second hydrophilic region by a hydrophobic channel (see FIG. 5A). In this example, a hydrophilic transfer region is a terminal consisting of a circle and the second hydrophilic region is an open ring surrounding the hydrophilic transfer region. A hydrophobic channel separates the two hydrophilic regions. A surfactant is deposited within the hydrophilic transfer region. This valve arrangement of hydrophilic patterns and the surfactant promote wicking only from the hydrophilic transfer region to a second or acceptor hydrophilic region.

Figure 5B:
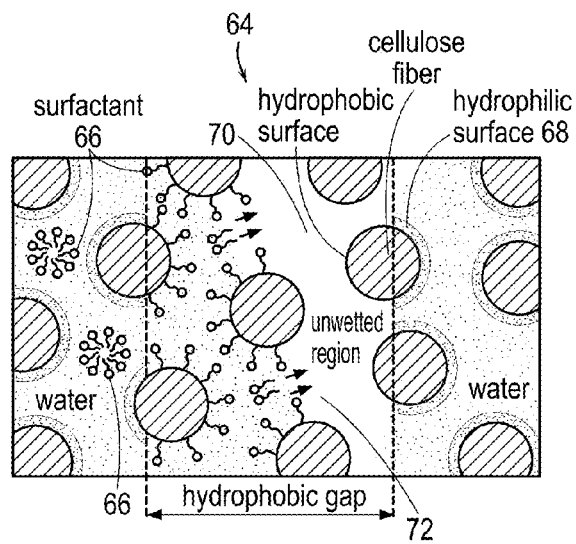
Figure 5C:
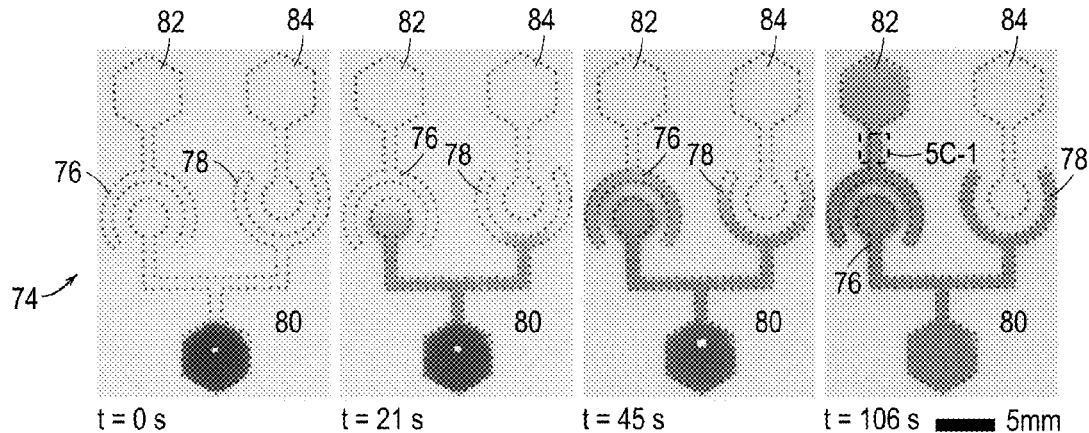

FIG. 5B illustrates microscopic events when a water-based fluid approaches the hydrophobic gap from the hydrophilic transfer region. The fluid approaching the hydrophilic transfer region dissolves the deposited surfactant and reaches the joint edges of the hydrophilic and the hydrophobic regions. The dissolved surfactant molecules adsorb to the water-air and the water-solid interfaces reducing the associated surface tensions. The surfactant molecules also adsorb to the hydrophobic solid-air interface at the locations closest to the contact line that is the edge of the fluid meniscus on the solid surface, resulting in a local increase of solid-air surface tension.

These changes of surface tensions increase the associated spreading coefficient, S, and promote fluid spreading along the hydrophobic surface, thereby "opening" the valve. In contrast, fluid approaching from the acceptor hydrophilic region is stopped because this region does not contain any surfactant.

The transfer by the surfactant-containing fluid from hydrophilic transfer region to the hydrophilic acceptor region is the critical factor in the design of the non-mechanical microfluidic valve. The fluid at the hydrophilic transfer region spreads away from the circle in all directions. In this example, the particular shape of the hydrophilic acceptor region provides a larger acceptor area to collect and guide the spreading fluid. In other applications, the size and shape of the hydrophilic transfer region and the hydrophilic acceptor region can be varied for the intended applications and the design used in this example is not limited. The dimensions of the hydrophilic transfer region and the hydrophilic acceptor region are determined principally by the resolution of the photopatterning process and the equipment used.

To validate the functionality of the non-mechanical microfluidic valve, two reverse oriented pairs of a hydrophilic transfer region and a hydrophilic acceptor region were tested in parallel (FIG. 5c). A hexagonal input terminal was connected to this pair of valves. Fifty microliters of water doped with a food dye was pipetted to the hexagonal terminal (time=0 s) and wicked along the bifurcated path and reached both valve pairs (t=21 s). The forwardly configured non-mechanical microfluidic valve (left) promoted wicking through the hydrophobic gap, whereas the reversely configured non-mechanical microfluidic valve (right) stopped the wicking (t=45 s). The final pattern of water (t=106 s) confirmed the function of the correctly configured non-mechanical microfluidic valve. In addition, it was observed that the water in the downstream channel of the left valve penetrated into the hydrophobic region by a small distance (see the inset of FIG. 5C).

This penetration was caused by the surfactant remaining in the advancing front of water. It was noted that surfactant depletion occurs when crossing hydrophobic gaps. The amount of deposited surfactant must be abundant to ensure the complete bridging of water through the gap. However, too much surfactant induces undesirable water spreading in downstream channels. The optimum concentration of deposited surfactant used in this example was found to be 3% Tween-20 in ethanol, weight per weight.

Figure 5D:
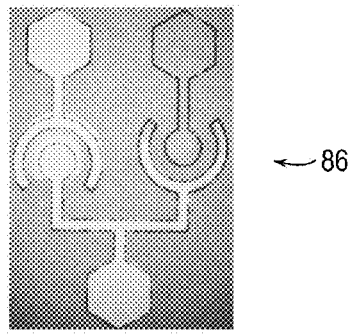
Figures 1, 5C:

In addition to water, the non-mechanical microfluidic valve was tested using a biological sample to demonstrate the breadth of applications for clinical diagnostics. In this test, human blood serum, a viscous fluid rich in proteins, was used as the working fluid. FIG. 5D shows bridging and stopping of blood serum in the forwardly (left) and the reversely (right) configured pairs, respectively. Through testing, it was found that the optimal concentration of deposited surfactant had to be increased to 50% Tween-20 in ethanol, weight per weight.

EXAMPLE 4

A Non-Mechanical Microfluidic Trigger Valve

Non-mechanical microfluidic valves were used as building blocks to create more complicated elements such as a trigger valve and a delay valve.

As an illustration, a trigger valve was required to perform more complex diagnostic assays, where it is required to mix a sample with a reactive fluid that is released in a timed period. As illustrated in FIG. 6B, a fluid sample, serving as a triggering fluid, was used to open the valve at a given time so that a gated fluid containing a reactive agent, such as an enzyme substrate, or a binding protein, such as an antibody, could react before reaching a terminal point.

In this design, a non-mechanical microfluidic valve was placed downstream of the injection channel to form a trigger valve (shown schematically in FIG. 6A). As shown in FIG. 6B, a triggering fluid (green) was added to the injection region (hexagon, left) that diverged into two streams after t=89 s. In one direction, the fluid moved toward and reached the microfluidic valve at t=119 s. At t=148 s the trigger fluid bridged the hydrophobic gap thereby allowing the gated fluid (blue) to pass across the hydrophobic gap and mix with the trigger fluid. The mixed trigger and gated fluids then moved together and reached the unwetted absorption terminal at t=292 s.

In this example, 50 µl of the triggering fluid and 100 µl of the gated fluid were used. A surprising feature was observed in the micrograph at t=148 s, namely that the trigger fluid has a preference for wicking toward the microfluidic valve rather than the absorption terminal. This implies that the amount of the triggering fluid that is deposited in the injection region is adequate to reach and bridge the microfluidic valve. Thus, it will be primarily the gated fluid that reaches the absorption terminal. Therefore, the amounts of the triggering and gated fluids can be adjusted accordingly to ensure that the desired concentration of fluids reach the absorption terminal.

EXAMPLE 5

A Non-Mechanical Microfluidic Delay Valve

A hydrophilic transfer region and a hydrophilic acceptor region can be joined using a bridging channel to form a delay valve (shown schematically in FIG. 7A). The length of the bridging channel determines the time delay. Two valves with different delay times were demonstrated with bridging channels having different lengths resulting in one delay time being about twice as long as the other (see FIG. 7B: left, 29 mm; right, 63 mm). A fluid volume of 100 µl was applied simultaneously to both input terminals (t=15 s). The valve with the short bridging channel (left) opened approximately in 3 minutes (t=152 s), whereas the one with the long bridging channel (right) opened approximately in 9 minutes (t=553 s). After the opening, both advancing fronts of the fluids in the two valves moved towards the corresponding absorption terminals. It was found that the relation between the delay time, t, and the length of the bridging channel, L, is nonlinear according to Washburn's equation, $t/L^2$. This observation confirmed that doubling the length of the bridging channel extended the delay of the valve opening to approximately 3.7 times.

EXAMPLE 6

More Complex Systems using Multiple Microfluidic Valves

The non-mechanical microfluidic valves are the basic elements that can be assembled into a more complex diagnostic device, which is able to release and combine fluids containing different soluble materials. In this example, two non-mechanical microfluidic valves, one of which is a delay valve, were used to construct a sequential-loading system. As shown in the FIG. 8A, the first valve (diode 1) was inserted between the input terminal of fluid B and the loop of the delay valve. The delay valve consists of valve 2 (diode 2) and the bridging channel. Valve 1 was reversely configured to gate fluid B. A second input terminal for fluid A is added close to the hydrophilic acceptor region of valve 2. All the fluids move towards a large absorption terminal. In this and other examples, all fluidic channels used in the delay devices are shown to have the same width. To reduce the footprint of the devices, a channel's width can be reduced at a certain location to restrict fluid flow, similar to a resistor in electrical circuits. Conversely, the width can be expanded to absorb the fluid momentarily before it proceeds along the channel, providing a function similar to a capacitor in an electrical circuit.

The system manipulated the fluids to sequentially pass through the reaction spot, shown in FIG. 8B. To initiate operation, Fluid B (blue) and Fluid A (green) were loaded to the corresponding input terminals at the same time. It was observed that Fluid A diverged into two streams. One stream moved to the acceptor region of valve 2 (t=46 s). The other stream passed through the reaction spot to the transfer region of valve 1. Fluid A opened valve 1, thereby triggering the wicking of Fluid B through it. Because valve 2 was gated, Fluid B moved along the bridging channel (t=340 s) to the transfer region of valve 2. Upon opening valve 2, Fluid B was able to pass through the reaction spot, replacing Fluid A and continuing on to the absorption terminal (t=618 s). The length of the bridging channel controlled the timing of the sequential loading. In this example, the length of the shortcut is roughly one third of that of the bridging channel. Therefore, the flow flux of Fluid B through the shortcut path is significantly larger than that in the bridging channel.

The sequential-loading system is particularly useful for biological assays. In one such example, one can adapt the multiple valve system for a multistep immunoassay in which target antigens are trapped at the reaction spot in the device and subsequently detected using a secondary antibody conjugated with a detection indicator.

EXAMPLE 7

3D Paper-Based Fluidic Valves

To improve the flexibility of the sequential-loading system, it was demonstrated that layering of patterned paper formed paper-based fluidic devices with hydrophilic channels in 3D (FIGS. 9A, 9C and 9E). The patterned layers shown in FIG. 9A and FIG. 9C were aligned, and stapled together at the circular contact spots, forming the two devices shown in FIG. 9B and 9D, respectively. The spots in the top layers were wetted autonomously via channels in the bottom layers, allowing fluids to move vertically and laterally. In FIG. 9B, the device was shown to distribute dye-containing water (orange or green in color) from two large spots into two 2×2 arrays of small spots. If one changed the pattern of the hydrophilic channels in the bottom layers, the fluid distribution was altered according the new configuration. The device shown in FIG. 9d distributed water into two 4×1 arrays.

It was further demonstrated that if one assembled three layers of patterned paper (see FIG. 9E) by the same manner two water streams were able to cross each other without mixing. As illustrated, the streams (orange or green in color, 100 μl) were fed to the two circular ends, moved along the hydrophilic 3D paths, and crossed over each other for four times (see FIG. 9F). FIG. 9G shows the cross section along the dotted line in FIG. 9F showing the multiple layer stacking and alignment of vertical channels.

In another embodiment of the 3D fluidic valve invention, wax printing was used as an alternative method to define hydrophilic channels on paper. To assemble a 3D device, wax printed areas were assembled by cutting to the size, aligning the printed areas into a stack, and adhering the combined stack using any number of methods such as tape and glue to prevent the escape of fluid in undesired areas and to prevent evaporation of fluids. Once assembled the stack would form the 3D fluidic valve that regulated fluid flow across the layers. This design of this 3D fluidic valve is shown in FIG. 10B.

The fluidic valve was fabricated on paper containing the following elements: two layers containing hydrophilic channels and terminals, a hydrophobic layer containing hydrophobic permeable gap that separates the channels, and an amount of surfactant deposited onto one of the channel terminals to facilitate transport across the hydrophobic permeable gap in the direction desired. The directional flow of the valve is always from the terminal containing surfactant to the terminal that does not contain the surfactant, similar to a 2D value. In some embodiments of the invention, the complexity of the diagnostic device may require additional layers containing hydrophilic channels, hydrophobic layer permeable gaps, and companion surfactant in the transfer terminal. The minimal requirement however, is three layers.

In the present example, three layers of materials were used to construct the valve (FIG. 10B): the top and bottom hydrophilic paper layers contain 1 mm wide channels and terminals defined by wax contours printed on and melted into the fabric of the paper. The middle layer contains a hydrophobic permeable paper disk fitted to a 4 mm diameter hole on a double-sided and impermeable tape. The paper disk is cut from trichlorsilane-treated paper of approximately 140 μm in thickness. Other materials with similar permeable hydrophobic properties can substitute the disk. Paper of other thickness could be used provided that the disk is slightly thicker than the tape to maintain a good contact with the adjacent layers after assembling.

Alternatively, the surfactant can be deposited directly to the hydrophobic disk by applying it as a thin layer of agent that does not penetrate to the opposite side of the disk. The surfactant is deposited into and dried onto the terminal of the channel in the bottom layer prior to assembling. The round terminals of the channels are aligned to the disk forming a permanent assembly with a thickness of approximately 0.5 mm. The shape of the aligning terminals of the channels and the hydrophobic disks do not necessarily have to be round. For example, square and rectangular terminals and disks can also be used.

Contours of channels are printed on 200 μm thick filter paper using a Xerox Colorqube Printer. The printed paper is placed in a 150° C. oven for 40 seconds to allow the wax to melt downwards, which also inks the other side of the paper. The melting broadens the wax lines by approximately 0.5 mm. The double-sided tape (ACE plastic carpet tape) is punched with through holes using a 4 μm diameter biopsy punch. The hydrophobic paper disks are prepared in two steps: 140 μM thick filter paper is rendered hydrophobic by soaking it in perfluorocarbon oil containing 3% (weight percentage) of Allyltricholrosilane for 1 hr, washing it in ethanol, and then drying it on a hotplate at 50° C. The disks are cut from the filter using a biopsy punch. The hydrophilic paper disks are fabricated using the punch and the unmodified filter paper. Prior to assembling, 0.4 μl of a surfactant solution (Tween-20, 2.5% in ethanol, by weight) is deposited to each corresponding onto each transfer location followed by drying at room temperature. The devices are assembled layer by layer.

In the absence of surfactant, the hydrophobic disk prevents a fluid from moving from the top to the bottom layer. To permit fluid transfer between hydrophilic layers, a fluid deposited in the loading terminal travels to the circular transfer area where it dissolves the pre-deposited surfactant acting to reduce the fluid surface tension and facilitating the transfer of the fluid from the bottom layer to the top layer through the hydrophobic permeable disk. The diameter of the disc area can be altered to increase or decrease the amount of fluid or the time to transfer fluid across the permeable hydrophobic disc. While in this example, a circular area was used, any desired shapes can be substituted depending upon the required need.

Figure 10C:
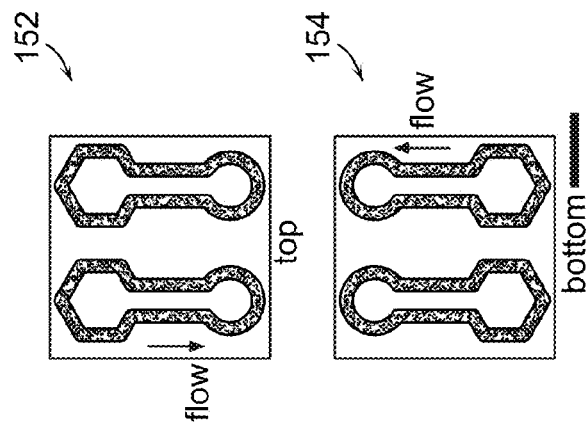
FIGS. 10A-10C show illustrative diagrammatic views of a representative one way valve, layers of a device in accordance with an embodiment of the invention, and top and bottom layers thereof.
Figure 10B:
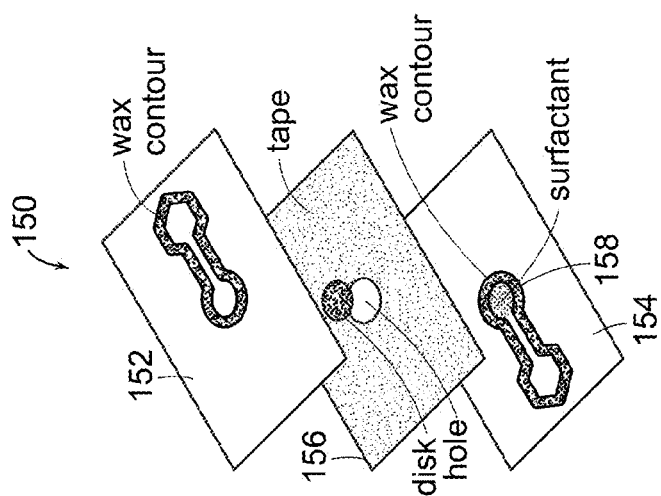
Figure 10A:
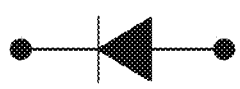

To demonstrate the capability of the device, water containing a dye was deposited to one of the two neighboring loading terminals (FIG. 10c). A drop of water was deposited to the hexagonal loading terminal on the top layer without the surfactant in the circular transfer region. The fluid deposited on the top layer was retained on the top layer throughout the experiment. In contrast, depositing a drop of water to the bottom loading hexagon terminal transferred to the circular transfer region containing the surfactant and when the surfactant was solubilized the fluid was able to transfer through the hydrophobic permeable region to the top layer quickly demonstrating the function of the 3D valve.

EXAMPLE 8

A 3D Delayed Trigger Valve

Attaching a channel of varying lengths to the 3D valve formed a trigger valve with a delay. Similar to the 2D valve, the length of the channel was able to increase or decrease the time of the delay (see FIG. 11C). A trigger valve is three-terminal component that can stop a fluid until the feeding of a secondary triggering fluid. The trigger valve consists of a valve with a channel that branches off at the valve (see FIG. 11A). The valve and the channel are arranged in such way that the triggering fluid can move along the channel to short the valve, allowing the gated fluid to pass. In this example, the trigger valve consisted of three stacked layers (see FIG. 11B). The top layer contains two channels: the shorter channel (gate channel) accepts a gated fluid; the longer and turned channel (trigger channel) accepts a triggering fluid. The round transfer regions of the channels are aligned to two paper disks fitted in two separate through holes on the tape, which is the middle layer. The disk aligned with the shorter channel is hydrophobic, whereas the other disk is natively hydrophilic. The bottom layer contains a channel that visually joins the two channels on the top layer at the vertical direction. This layer contains a surfactant spot in the round transfer region aligned to the hydrophobic disk in the middle layer.

Figure 11C:
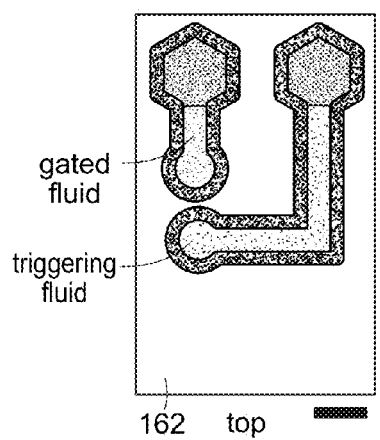
Figure 11D:
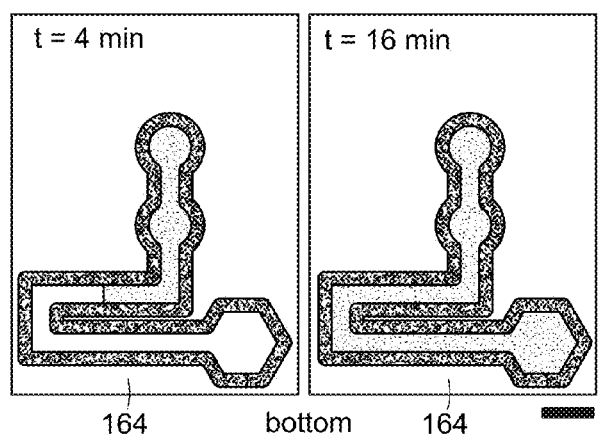

The delayed trigger valve was demonstrated by adding a drop of dye-containing water (blue) to the gate channel (see FIG. 11C). The valve stopped the fluid transfer to the bottom layer. In contrast, a drop of triggering fluid (yellow) added to the terminal on the top layer spreaded to the bottom layer terminal, containing surfactant, and moved bi-directionally towards the end terminal. Once the surfactant was solubilized, the fluid was able to penetrate the hydrophobic disk and opened the valve to release the gated fluid (see FIG. 11D). With the valve open, the gated fluid was released and mixed with the triggering fluid on the bottom layer and made the channel appear green (FIG. 21l, t=16 min).

EXAMPLE 9

A 3D Delayed Trigger Valve for Single Fluids

In certain diagnostics testing, it may be of interest not to release the entire fluid at once but have it delivered after a certain amount of time. In this instance, the delayed trigger valve can provide this by merging the terminal of the trigger channel with the gate channel forms (see FIGS. 12A and 12B). The delay creates a time lag when the bulk of the fluid is transferred to the other layer. The length, L, of the channel that is connected to the circular transfer region adjacent to the hydrophilic non-valve disk, adjusts the timing of the delay.

In this example, it was demonstrated that varying the length of the timing channel (L=7, 19, 25 mm) created delays with adjusted delay time (FIG. 12C). Each of the three loading regions was loaded with dye-containing water. The shorter length of the timing channel results in rapid transfer of the fluid. For example, the fluid toke approximately 1.5 minutes to reach the circular transfer region on the top layer with L=7 mm. In this case, the fluid passed to the outlet terminal in 5-9 minutes (FIG. 12C). Other delays were longer depending upon the length of the channel. For the L=25 mm channel the delay was 12 to 17 minutes, while for the L=19 mm the delay was 10 to 13 minutes.

EXAMPLE 10

Sequential Fluidic Valves

For more sophisticated diagnostic testing, it would be essential to pass two or more fluids through a designated region to provide washing, binding agents, or colorimetric detection.

In this design, two valves were constructed with each having two fluid loading terminals and two companion circular transfer regions where the fluids were passed through a single target spot sequentially (See FIG. 13A). Both input terminals were connected to reverse facing. The footprint of this circuit was about 24×24 mm$^2$ in size, which is similar to that of a postage stamp (see FIG. 13D). The device was operated using only two drops of water.

For the sequential-loading circuit, all layers used the filter paper described previously except for Layer 3 that is made of a piece of 300 um thick polyester-cellulose cloth (ITW Texwipe, NC, USA).

The construction of 3D diagnostic valve device is shown in FIG. 13B as discussed above. The device was constructed with five layers, of which three layers are paper and two layers are tape aligned and stacked together. Layers 1, 2 and 3 contain two valves whose configuration is shown in the figure. The target spot for the fluid mixing is located at the center of the top layer. Layer 5 is a 0.8 mm thick paper that is used as a waste absorbent for Layer 3. Layer 4 acts to restrict the absorption through a single though hole containing a hydrophilic disk.

To demonstrate its diagnostic operation, two fluids containing red or blue dyes were placed to the corresponding loading inlets on Layer 1. Only Fluid A moved to the target spot while some of the fluid was passed through the hydrophilic disk to the circular transfer region below. The Fluid A subsequently was split into two directions on Layer 3. In one direction, Fluid A moved toward the adjacent circular transfer region for Fluid B and solubilized the surfactant to open the valve for Fluid B. Once the valve is open, Fluid B is transfer to Layer 3 and mixes with Fluid A in the channel on Layer 3. The mixed fluids stream traveled through a delay channel on Layer 3 toward the second circular transfer region beneath the hydrophobic valve adjoined to Fluid A in a second circular region in the loading terminal.

Once the valve is open, Fluid B has an alternate and shorter route to reach the absorption pad. The newly openly faster route passes the center spot on Layer 1 (dashed line), whereas the second slower route remains within Layer 3 (dotted line).

By feeding two dye-containing fluids (yellow and blue), it was demonstrated that the color of the center spot on the top layer changes from yellow, to green (upon mixing), and finally blue (FIG. 13C). The images of the device were recorded at three different times and the intensity of the center spot was measured for each image. The measurement of the intensity at the spot also shows the fading of yellow color and the brightening of blue color over time. These results confirmed the sequential-loading function of the device.

EXAMPLE 11

More Complex Sequential Fluidic Valves

Figure 14:
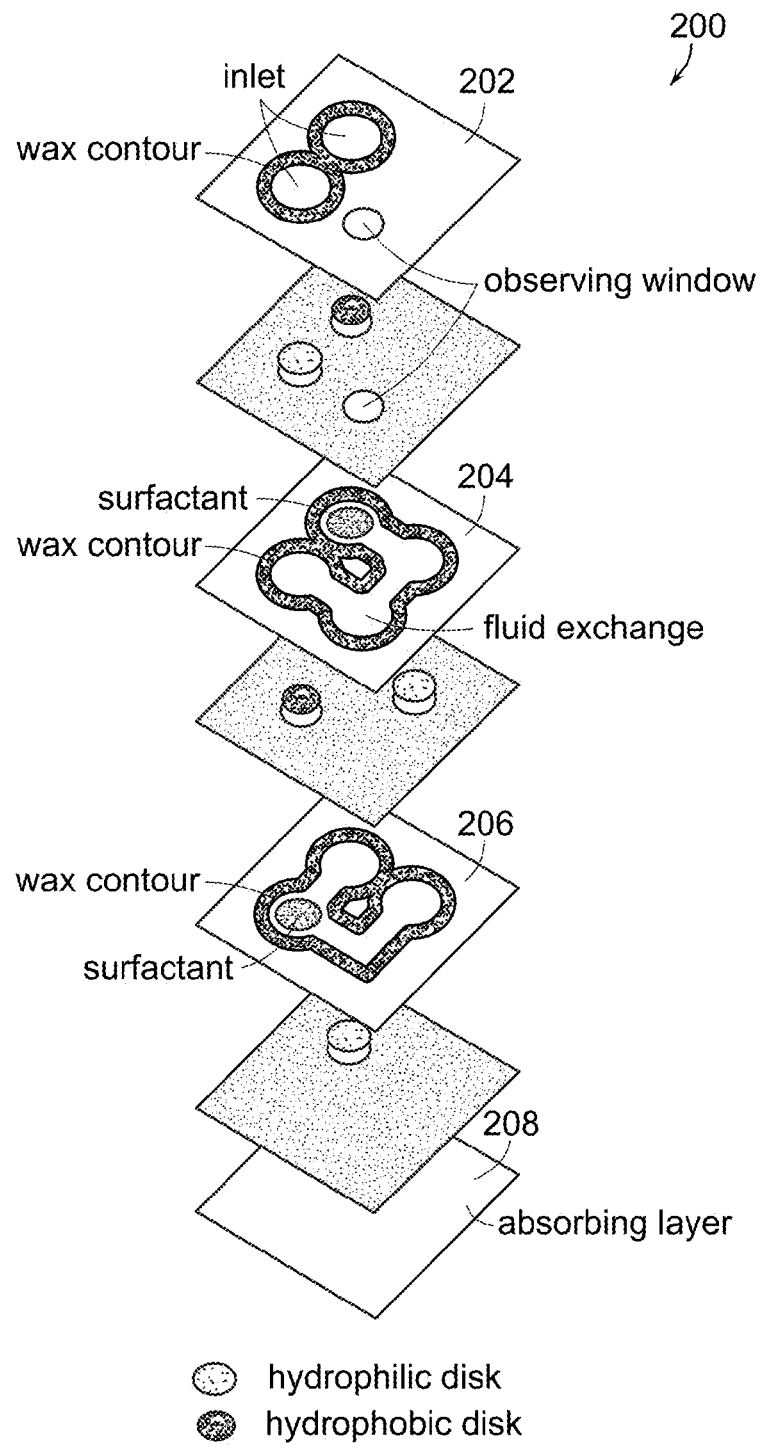
FIG. 14 shows an illustrative diagrammatic view of a three-dimensional device in accordance with a further embodiment of the present invention.

It should be noted that there exists numerous combinations to construct 3D sequential-loading devices shown in FIG. 13B, depending upon the use required for the diagnostic assay. For example, FIG. 14 shows at microfluidic system that includes three layers 202, 204, 206 separated by tapes that each include apertures, hydrophilic discs and hydrophobic discs, and an absorbing bottom layer 208 as shown. The 3D assembly incorporates 7 layers of material. This assembly incorporates 2 additional layers, including a paper and tape layers, to distribute fluidic channels across the added layers. In this design, the length of the channels could be reduced in each paper layer, leading to further miniaturization of the footprint.

Figure 15A:
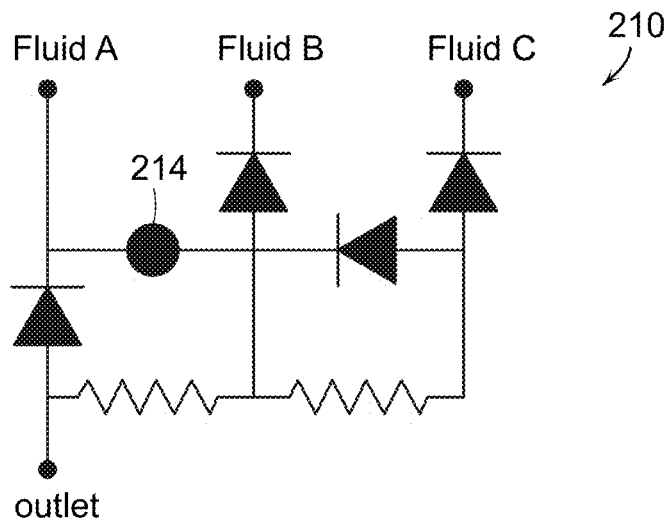
FIGS. 15A-15B show an illustrative diagrammatic views of electrical comparison schematic diagrams of device circuits in accordance with further embodiment of the present invention.
Figure 15B:
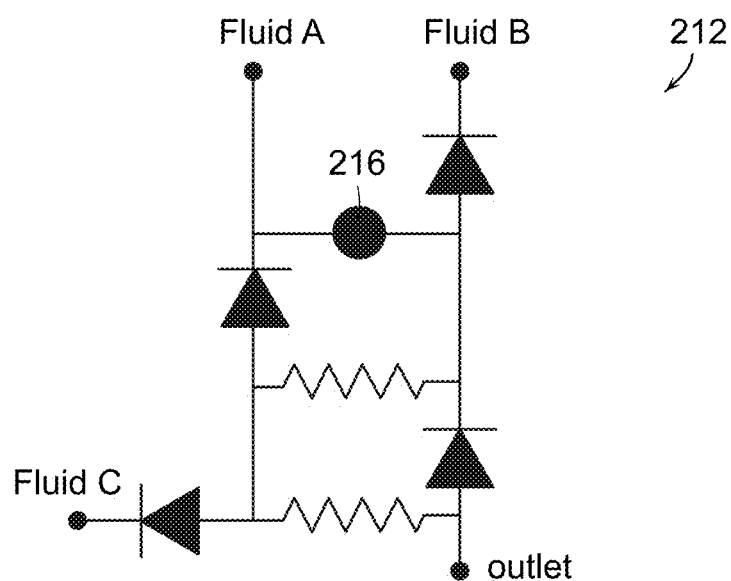

In yet other examples, the fluidic valve technology is capable to manipulate more than two fluids to pass a designated spot in the circuit. In FIGS. 15A and 15B two examples of sequential valve diagrams are shown at 210 and 212 in schematic form. In the first diagram, FIG. 15B, three fluids are timed to exchange in the target circular spot 216. The triangles represent the directional of the valve. The zig-zag channels represent delay channels in which flow rate of a fluid is slowed relative to others channels in the device. In this device, the sequential order of fluids being passed through the target spot is Fluid A, then Fluid B, then mixture of Fluid B and C. In another example, the order was altered so that the sequential order of fluids being passed through the target spot (214 or 216) is Fluid A, then Fluid B, then mixture of Fluid A and C.

The simple eloquence of the fluidic valve technology is that it readily can be adapted to handle a variety of fluidic exchanges depending upon the desired diagnostic application, such as sample fluids, detection binding agents, colorimetric substrates, washing fluids, enzyme activators or inhibitors, and any other materials contained in a fluid.

EXAMPLE 12

Fluid Reservoirs

Fluidic circuits required sufficient fluid volumes to perform the desired function and in certain cases, such as washing fluids, may require larger volumes to feed into their inlet terminals. The feeding process can be achieved by using reservoirs built into the fluidic device that carry the reagents. Folding the paper device on a predetermined axis and matching the reservoirs with fluid inlet terminals on the paper circuit can assemble these devices with larger reservoirs. The reservoirs themselves are designed to allow for inlet flow regardless of the direction of the force of gravity and do not allow for fluid flow before the reservoirs are connected to the paper circuit.

Figure 16A:
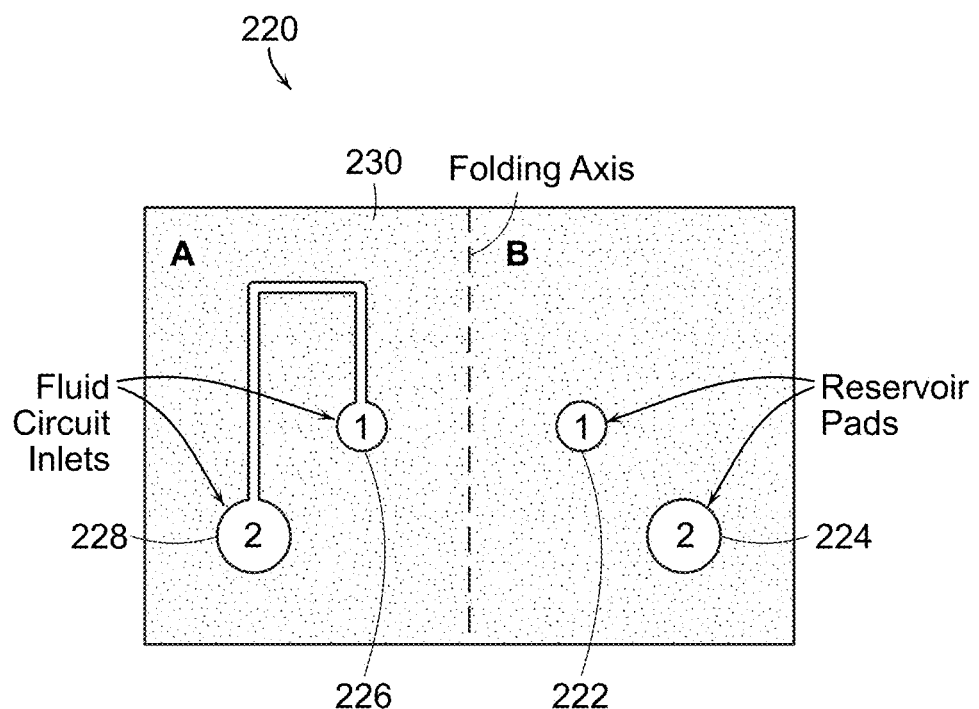
FIGS. 16A-16B show illustrative diagrammatic views of a fluidic valve in accordance with an embodiment of the invention, and a device including a reservoir.
Figure 16B:
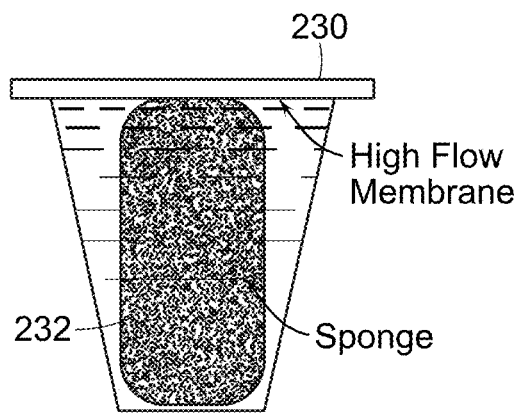

As illustrated in the system 220 of FIG. 16A, thin walled plastic reservoirs 222, 224 may be used to hold reagent fluids and are inserted into slots 1 and 2 (226, 228) on side B of the paper chip 230. To prevent leaking during storage, a thin, impermeable membrane initially covers the reservoirs. Before the device can be used, the membrane is removed leaving pre-wetted reservoir pads that will be lined up with fluid inlet terminals during the folding action. The reservoir pads will prevent reagents from pouring out but allow for capillary flow into the paper fluid inlets. As shown in FIG. 16B, a sponge 232 is used to guide fluid within each reservoir to the connection with the paper circuit in such a way that the device can be held in any direction and still have capillary flow out of the chamber regardless of the direction of gravity.

The reservoirs that hold the reagents for a diagnostic assay have two membranes over the opening. The outer layer is an impermeable membrane that is used as protection against evaporation, spillage, and contamination during storage. This membrane is removed immediately before use of the device. The second membrane prevents the fluid reagent from pouring out of the reservoir, yet has a pore size, which allows for capillary flow when in contact with the fluid device (FIG. 16B). This membrane also adds some thickness to ensure full contact between the reservoir and the diagnostic device. To counteract the settling of the fluid reagent because of gravity, an artificial sponge is used on the inside of each reservoir to guide the reagent out of the reservoir.

EXAMPLE 13

Device Architecture for Large Volume Fluid Reservoirs

Figure 17A:
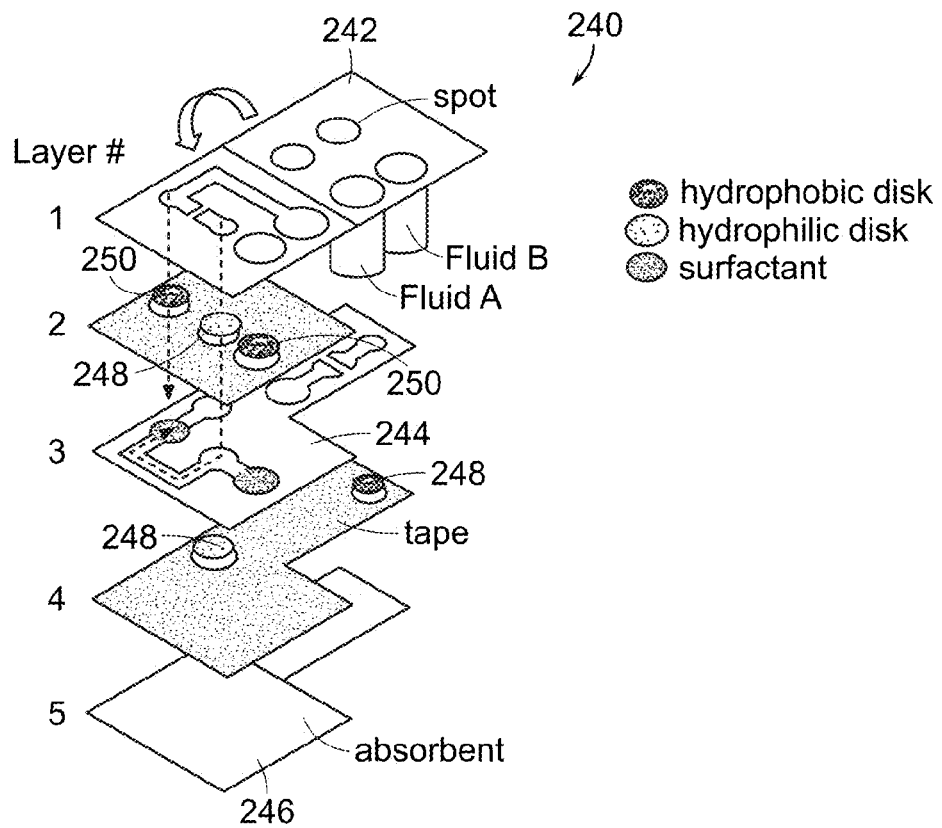
FIGS. 17A-17B show illustrative diagrammatic views of a further fluidic valve coupled to a reservoir in accordance with a further embodiment of the invention, as well as a schematic illustration of a manufacturing processing step in forming the fluidic valve.
Figure 17B:
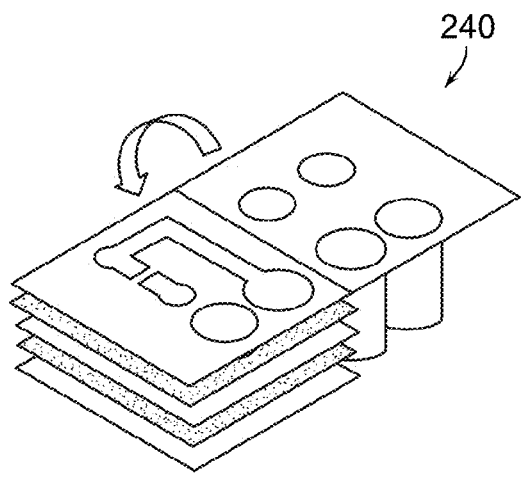

In yet other embodiments to increase the functionality of the diagnostic device, another design is shown for passing a large quantity of sample through a target spot. A folding structure has been developed to accomplish this in a 3D sequential-loading device. This folding structure is an extension of the standard two input sequential-loading circuit, by integrating a movable detection target spot. For example, FIGS. 17A and 17B show a five layer system 240 that includes layers 242 and 244, as well as tape layers and an absorbent layer 246. The tape layers include apertures and hydrophobiuc discs 250 and hydrophilic discs 248.

Prior to folding the microfluidic channels are discontinuous. When detection target spot and reservoirs are folded over into the detection position, the diagnostic device becomes functional by allowed the transfer of fluids to pass through the target spot is designed manner.

EXAMPLE 14

Alternative Design Enabling Functionality

Figure 18A:
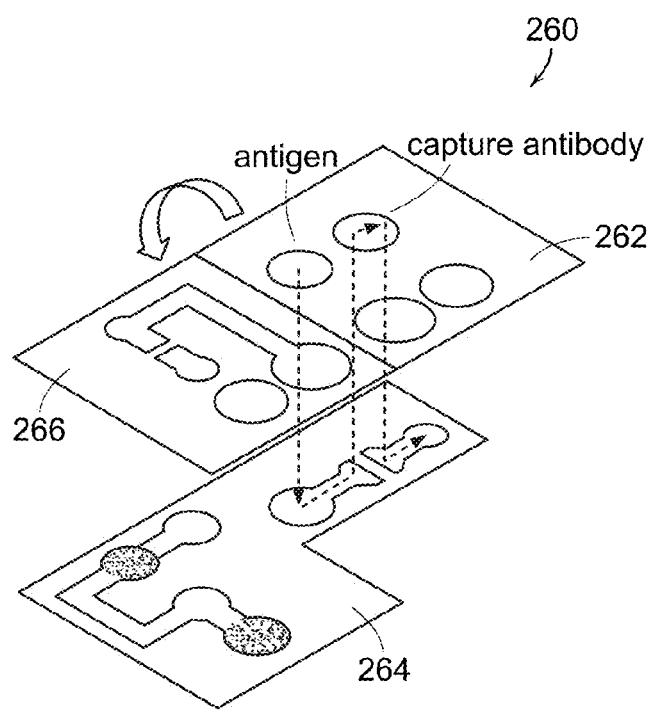
FIGS. 18A-18B show illustrative diagrammatic views of further fluidic valves coupled to a reservoir showing loading and directional flow, as well we a schematic illustration of a manufacturing processing step in forming the fluidic valve.
Figure 18B:
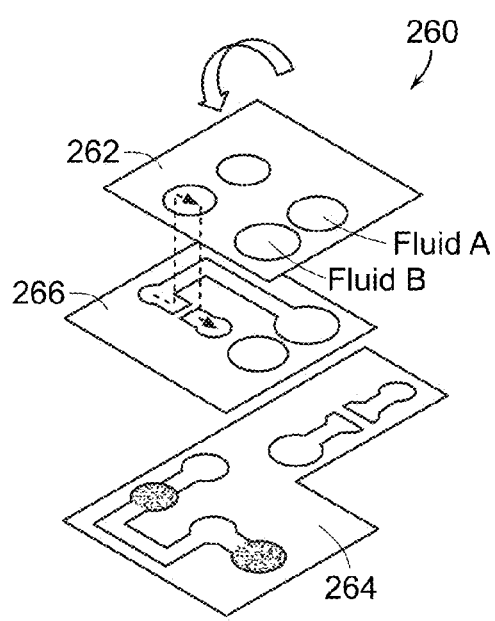

In yet alternative example of a simple two-step diagnostic device that becomes functional upon folding is shown in FIGS. 18A and 18B in which a first layer portion 262 is folded onto a second layer portion 266, and then positioned above another layer 264. The layers include circuits with valves in accordance with the invention as shown to provide a fluidic valve with a coupled reservoir. Initially the top layer is parallel to the remaining layers (see FIG. 18A). For example, a fluid sample containing a antigen to be detected is placed in the inlet terminal to the left of the target spot. The fluid sample flows through the hydrophilic channel, and up and over the detection target spot containing dried immobilized capture antibody, and then down to the absorption pad. The absorption pad should have excess volume capacity to absorb all fluids that are containing in the device.

To enable the device, after the right half of the top layer will be folded 180° manually (see FIG. 18B). Successfully un-bridging the detection 'spot' from the sample while the target spot will then bridge the channel of the circuit, allowing a detection antibody to pass through the spot, as previously described herein. The folding action simultaneously makes contact between the detection antibody and substrate, Fluids A and B, respectively, to the two inlets on the left side of the circuit.

EXAMPLE 15

A Diagnostic Fluid Device Using an Enzyme Detection System

A diagnostic fluid device using fluorescence detection, such as GFP, is well known in the art. In other embodiments, a visible detection using gold or an enzyme based detection approaches would provide a visual assessment without a highly specialized detector. This example demonstrates the use of an enzyme linked detection system similar to that used in a standardized ELISA assay but performed in a paper 3D fluid device. The paper based ELISA is denoted as PELISA.

The PELISA device was fabricated by patterning hydrophobic wax in hydrophilic sheets of paper to create channels as described herein. After patterning, the layers were stacked to form a sequential-loading device. For this demonstration, the antigen to be detected was rabbit IgG, as a model analyte. The concentrations of rabbit IgG to be detected ranged from 1 µg/mL to 1 mg/mL.

Colorimetric assays are well known for usage in situations lacking expensive plate readers or fluorescence scanners. There are numerous enzyme/substrate pairs used in established ELISA to create a visible product. Alkaline phosphatase was used in this example as the detection enzyme with its substrate, BCIP/NBT (5-bromo-4-chloro-3-indolyl phosphate and nitro blue tetrazolium). This combination was selected because the color variation changes from yellow to purple, thereby producing an excellent distinction with the white background of the paper.

As a proof of concept, a PELISA 3D device was loaded in the detection region with 0.5 µL of sample containing a concentration of 100 ug/ml rabbit IgG. An antigen, 50 ng of rabbit IgG was immobilized by hydrophilic interaction on the detection region. In addition, the channel is coated with BSA to prevent nonspecific adsorption of proteins.

Figure 19A:
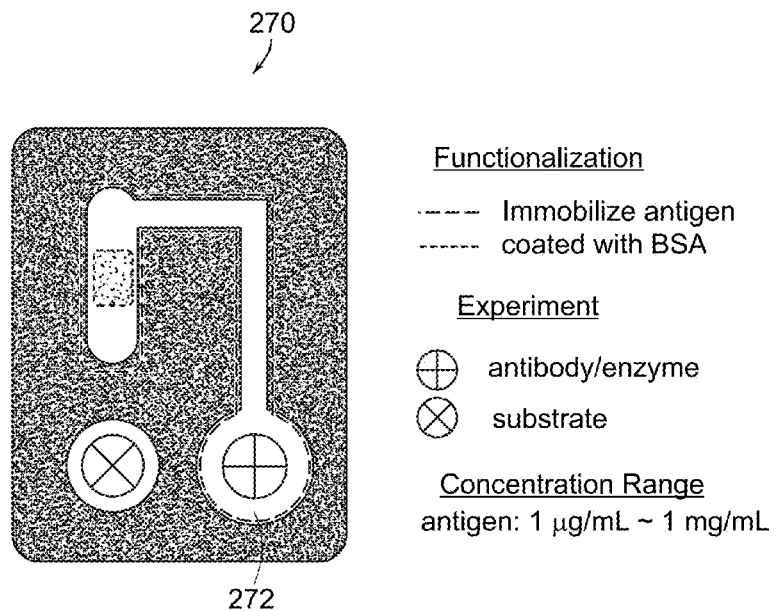
FIGS. 19A-19B show illustrative diagrammatic views of a fluidic valve using enzymatic detection showing the enzyme, the substrate and the detection spot, and five such detection assays.
Figure 19B:
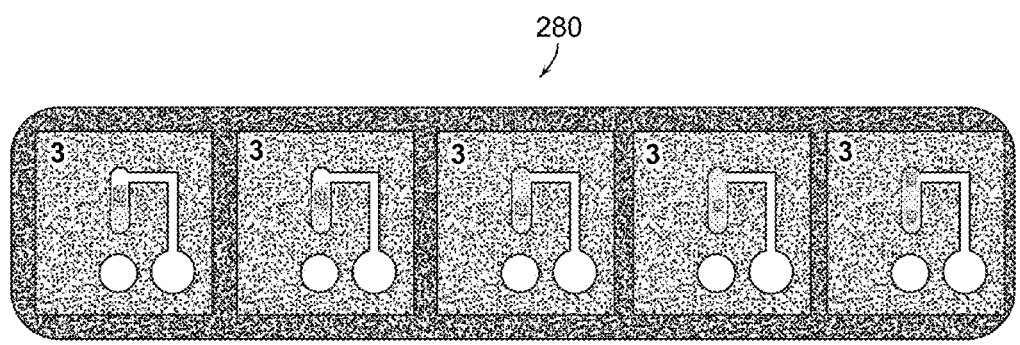

The device's gated terminal was loaded with 200 µL of substrate at the gated terminal. FIG. 19A, for example, shows a system 270 that provides for fluidic valve using enzymatic detection, and FIG. 19B shows five such detection arrays 280. To activate the device, 100 µL of enzyme-conjugated detection antibody was added to inlet terminal (shown at 272). The sample fluid passed through the detection region, allowing the enzyme-conjugated detection antibody to react with the bound rabbit IgG. The fluid continued through a non-valve hydrophilic disk into the delay channel in the layer underneath. The fluid in the delay channel flowed to a transfer region containing surfactant and opened the valve containing the gated substrate. Once opened the substrate traveled back through the channel and passed through the detection region. The bound enzyme-conjugated detection antibody subsequently reacted with the substrate to produce a visible purple color.

In FIG. 19B, four examples of the 100 ug/ml sample are shown. Samples of less or more rabbit IgG protein produced a corresponding lesser or greater purple product. This PELISA system can be used with any of the previously described sequential valve devices, though not limited to those specific devices described herein.

Those skilled in the art will appreciate that numerous modifications and variations may be made to the above disclosed embodiments without departing form the spirit and scope of the invention.

What is claimed is:

1. A microfluidic valve system comprising a matrix, a hydrophilic acceptor region, a hydrophilic transfer region, and a hydrophobic gap between the acceptor region and the transfer region, wherein said system further includes a wetting fluid that when added to the transfer region, solubilizes a transfer agent at the hydrophilic transfer region and permits the wetting fluid to span the hydrophobic gap to the hydrophilic acceptor region.

2. The microfluidic valve system as claimed in claim 1, wherein said transfer agent is separated from the hydrophilic acceptor region by the hydrophobic gap.

3. The microfluidic valve system as claimed in claim 1, wherein the transfer and acceptor regions include hydrophilic porous substrates.

4. The microfluidic valve system as claimed in claim 3, wherein said hydrophilic porous substrates are selected from a group consisting of cellulose, glass microfibers, cotton, wool, silk, and combinations thereof.

5. The microfluidic valve system as claimed in claim 1, wherein the hydrophobic gap includes a hydrophobic porous substrate.

6. The microfluidic valve system as claimed in claim 5, wherein said hydrophobic porous substrate is selected from a group consisting of polyvinylidene fluoride, nylon, nitrocellulose, polytetrafluoroethylene, mixed cellulose ester, and combinations thereof, as well as cellulose filter paper rendered hydrophobic by soaking in perfluorocarbon oil containing 3% by weight of Allytrichlorosilane.

7. The microfluidic valve system as claimed in claim 1, wherein said transfer agent is a surfactant.

8. The microfluidic valve system as claimed in claim 7, wherein said surfactant is a non-ionic surfactant selected from the group consisting of polyoxyethylene glycol alkyl ether, polyoxypropylene glycol, alkyl ether, polyoxyethylene glycol sorbitan alkyl ester (polysorbate), polysorbate 20 (Tween 20), polyoxyethylene glycol octylphenol ether (Triton X-100), glycerin, polyoxyethylene glycol alkylphenol ether, polyvinyl alcohol, polysorbate, glycerol alkyl ester, polyvinylpyrrolidone, polyethylene glycol, and glucoside alkyl ether.

9. The microfluidic valve system as claimed in claim 1, wherein said system includes a channel of a desired length between an input fluid terminal and the hydrophilic transfer region to provide a delay.

10. The microfluidic valve system as claimed in claim 1, wherein said system includes a valve that functions as a trigger valve, providing a release of a fluid when opened.

11. The microfluidic valve system as claimed in claim 1, wherein the hydrophobic gap permeates a thickness of hydrophilic media defining a hydrophobic channel separating the hydrophilic transfer region containing the transfer agent and the hydrophilic acceptor region.

12. The system of claim 1, wherein hydrophilic and hydrophobic regions are patterned on a medium using materials to create a physical solid barrier, a non-physical hydrophobic barrier or a combination thereof.

13. The system of claim 12, wherein the physical solid barrier is deposited onto the matrix and the material is selected from a group consisting of polystrene, PDMS, wax and photoresist.

14. The system of claim 12, wherein the non-physical hydrophobic barrier is made by covalently modifying the terminal groups of the matrix into hydrophobic and hydrophilic regions.

15. The system of claim 10, wherein the fluid is selected from a group consisting of a sample, buffer, antibody, enzyme, enzyme substrate, detection agent and a combination thereof.

16. The system of claim 15, wherein the detection agent is selected from a group consisting of a gold, fluorescence, phosphorescent, and luminescent tag or marker.

17. The system of claim 15, wherein the sample contains an analyte to be detected, wherein the analyte is selected from a group consisting of a peptide, protein, nucleic acid, fatty acid, metabolite, organic compound, inorganic compound or a combination thereof.

18. The system of claim 1, wherein the matrix contains a plurality of valves selected from a group consisting of microfluidic valve, delay valve and trigger valve.

19. The system of claim 18, wherein the plurality of valves is placed in a sequence to allow the transfer and mixing of a plurality of fluids.

20. The system of claim 19, wherein the plurality of sequential valves is configured on a single matrix or a plurality of matrixes in a three dimensional (3D) array.

21. The system of claim 19, wherein the plurality of sequential valves is configured on the plurality of matrixes, and wherein the matrixes in the 3D array are separated by an impermeable layer that prevents fluid transfer.

22. The system of claim 21, wherein the impermeable layer contains a porous hydrophobic region and a porous hydrophilic region.

23. The system of claim 22, wherein the porous hydrophobic region is the hydrophobic gap in the microfluidic valve.

24. The system of claim 21, wherein the microfluidic valve, when opened, transfers the fluid between the plurality of matrixes, wherein one matrix has the hydrophilic transfer region and another matrix has the hydrophilic acceptor region.

* * * * *